United States Patent [19]
Fujiwara et al.

[11] Patent Number: 5,142,618
[45] Date of Patent: Aug. 25, 1992

[54] WINDOW MANAGEMENT APPARATUS FOR A DOCUMENT CREATING APPARATUS

[75] Inventors: Masaki Fujiwara; Shigeki Taniguchi, both of Hitachi; Masaki Kawase, Katsuta; Hitoshi Tamura, Hitachi; Keiichi Nakane, Yokohama; Kiyoshi Masuda, Hitachi; Tadashi Kuwabara; Toshio Kushida, both of Yokohama; Junichi Seki, Hitachi; Hiroyuki Koreeda, Yokohama; Kozo Mineki, Hitachi, all of Japan

[73] Assignee: Hitachi, Ltd., Tokyo, Japan

[21] Appl. No.: 632,612

[22] Filed: Dec. 26, 1990

Related U.S. Application Data

[63] Continuation of Ser. No. 122,783, Nov. 19, 1987, abandoned.

[30] Foreign Application Priority Data

| Nov. 21, 1986 [JP] | Japan | 61-276598 |
| Nov. 29, 1986 [JP] | Japan | 61-285692 |
| Nov. 29, 1986 [JP] | Japan | 61-285693 |
| Nov. 29, 1986 [JP] | Japan | 61-285694 |
| Nov. 29, 1986 [JP] | Japan | 61-285695 |

[51] Int. Cl.⁵ .............................. G06F 3/14
[52] U.S. Cl. ............................ 395/146; 395/157
[58] Field of Search ........... 395/146, 157, 145, 147, 395/148

[56] References Cited

U.S. PATENT DOCUMENTS

| 4,581,710 | 4/1986 | Hasselmeir | 364/523 |
| 4,642,790 | 2/1987 | Minshull et al. | 364/900 |
| 4,653,020 | 3/1987 | Cheselka et al. | 364/900 |
| 4,723,210 | 2/1988 | Barker et al. | 364/300 |
| 4,723,211 | 2/1988 | Barker et al. | 364/300 |
| 4,764,867 | 8/1988 | Hess | 364/200 |

Primary Examiner—David L. Clark
Attorney, Agent, or Firm—Antonelli, Terry, Stout & Kraus

[57] ABSTRACT

A document creating apparatus for creating and editing a document in which a plurality of different types of descriptive element data, such as text data, graph data, pattern data, image data and other data, coexist. Plural types of edit sections are provided in correspondence with the types of data to be handled. Various types of data are edited under coordination by selecting edit sections corresponding to the types of data, respectively, while maintaining the editing function of the editing section once selected and activated so that the editing section can be selected again without losing its editing function.

7 Claims, 39 Drawing Sheets

DATA NAME DEFINITION TABLE (DNDT)

| DATA No. | DATA NAME |
|---|---|
| 0 | TEXT |
| 1 | PATTERN |
| 2 | GRAPH |
|  |  |
|  |  |

574

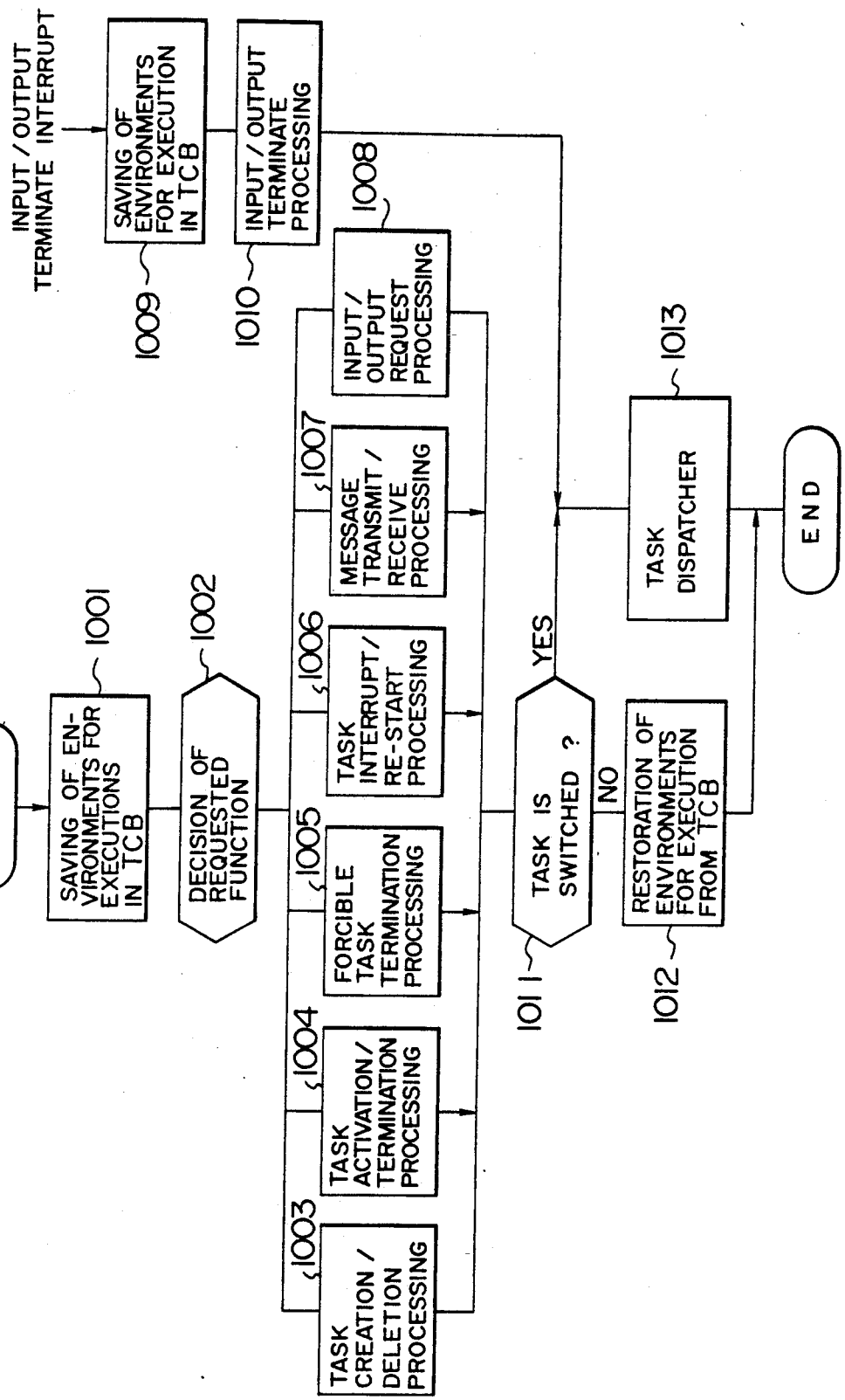
FIG. 12A (SYSTEM CONTROL 53)

(CREATION OF TASK)

(DELETION OF TASK)

(TASK ACTIVATION REQUEST)

(TERMINATION OF TASK)

(INTERRUPT OF TASK)

(RE-START OF TASK)

(FORCIBLE TERMINATION OF TASK)

(TRANSMISSION OF MESSAGE)

(RECEPTION OF MESSAGE)

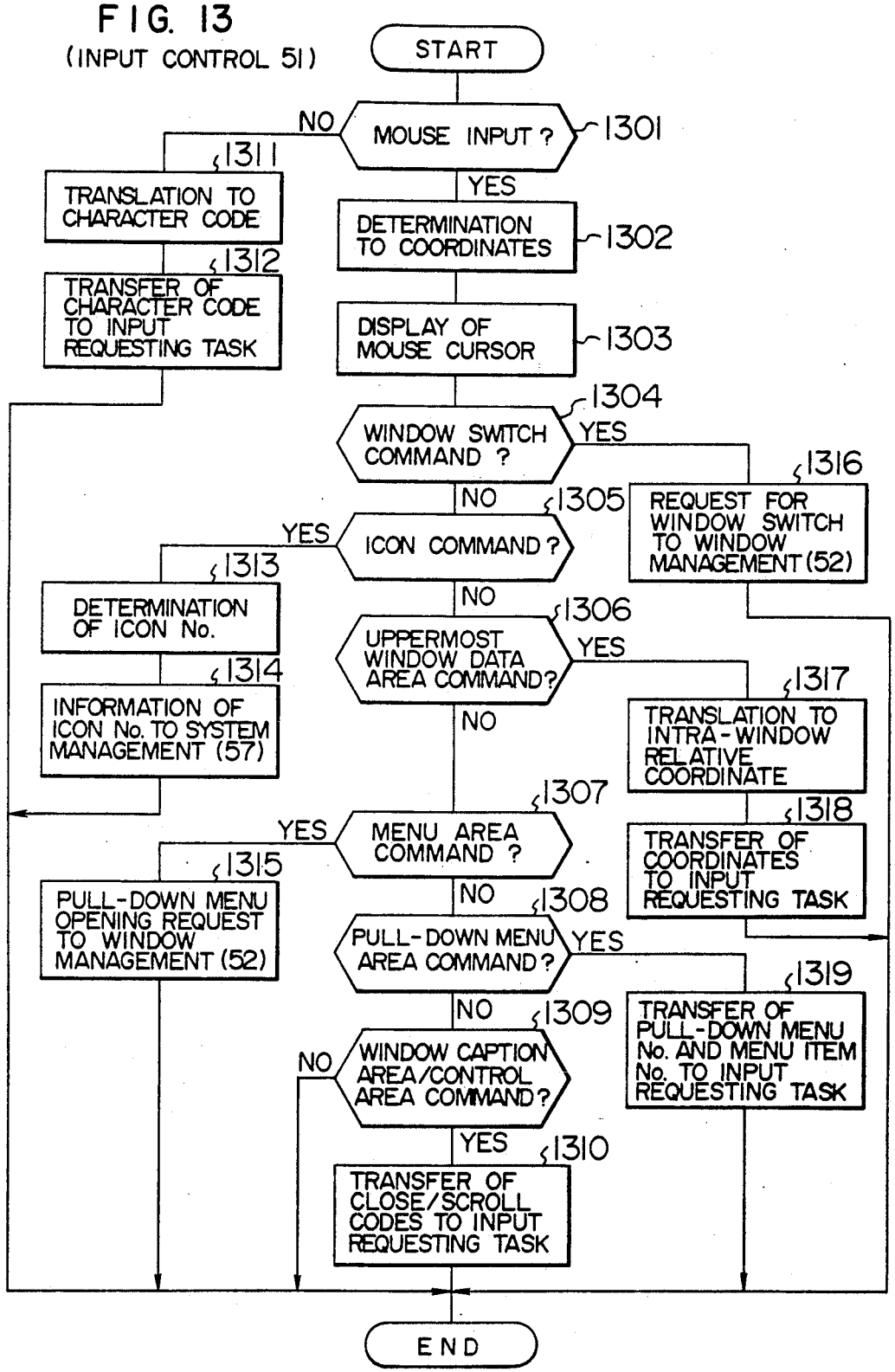

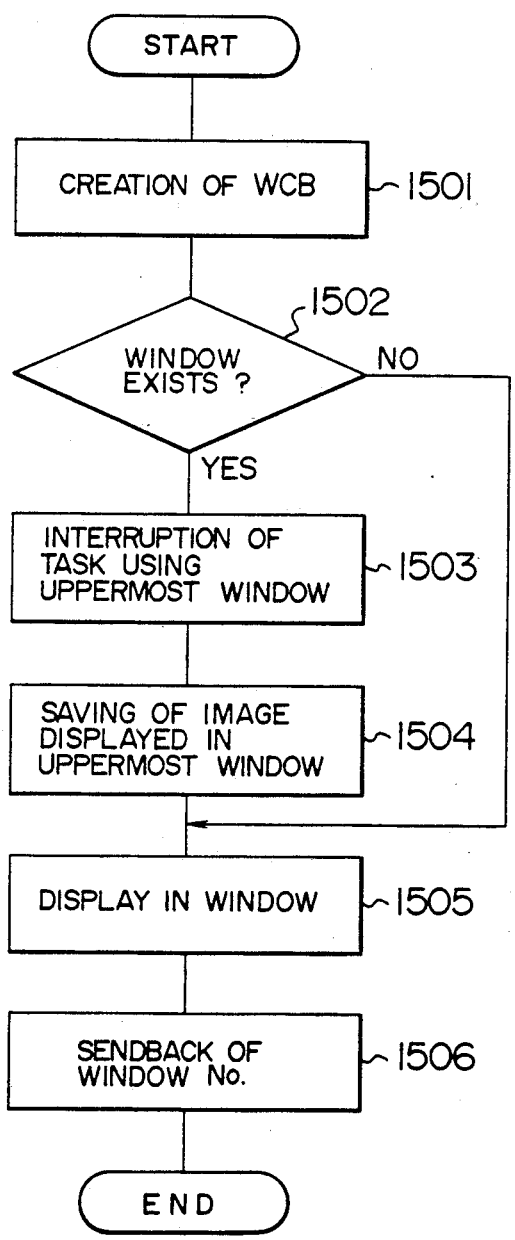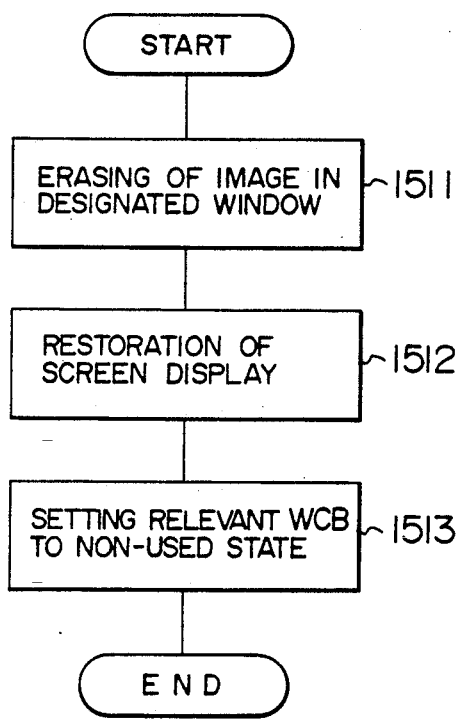

(SWITCHING OF WINDOW)

(SYSTEM MANAGE 57.)

(FILE EDITION 58)

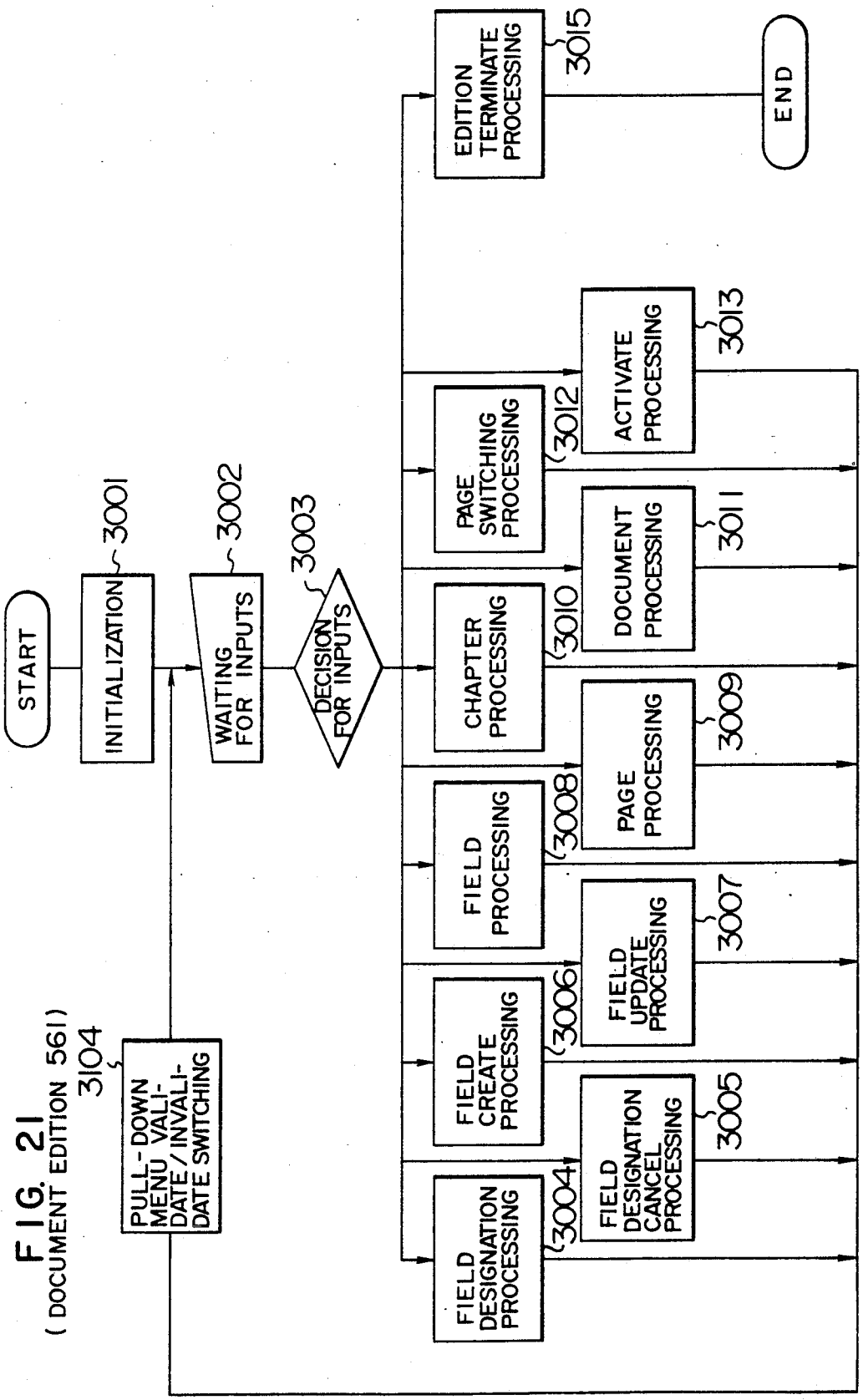
FIG. 21 (DOCUMENT EDITION 561)

DOCUMENT EDITION MENU TABLE

| NUMBER OF DESIGUNATED FIELDS | EXECUTABLE FIELD EDITION |
|---|---|
| 0 | CREATION |
| 1 | RENEWAL, ALTERATION OF ATTRIBUTES AND SIZE |
| MORE THAN 1 | DELETE, MOVE, COPY |

FIG. 27
SUPPORT FIELD EDITION MANAGE TABLE (SFMT)

| NUMBER OF FIELD EDIT SECTIONS i ~5681 | |
|---|---|
| PROGRAM No. ~5682 | DATA SPECISS No. ~5683 |
| $P_0$ | $D_0$ |
| ⋮ | ⋮ |
| $P_{i-1}$ | $D_{i-1}$ |
| ⋮ | ⋮ |

FIG. 28
TARGET FIELD TABLE

| NUMBER OF DESIGNATED FIELDS j ~5684 |
|---|
| DESIGNATED FIELD TYPE ~5685 |

| FIELD No. ~5686 |
|---|
| $F_0$ |
| ⋮ |
| $F_{j-1}$ |
| ⋮ |

FIG. 29
ACTIVATED EDIT TASK MANAGE TABLE

| NUMBER OF ACTIVATED TASKS k ~5687 | |
|---|---|
| TASK No. ~5688 | FIELD No. ~5689 |
| $T_0$ | $F_0$ |
| ⋮ | ⋮ |
| $T_{k-1}$ | $T_{k-1}$ |
| ⋮ | ⋮ |

FIG. 30 (PATTERN DATA EDITION)
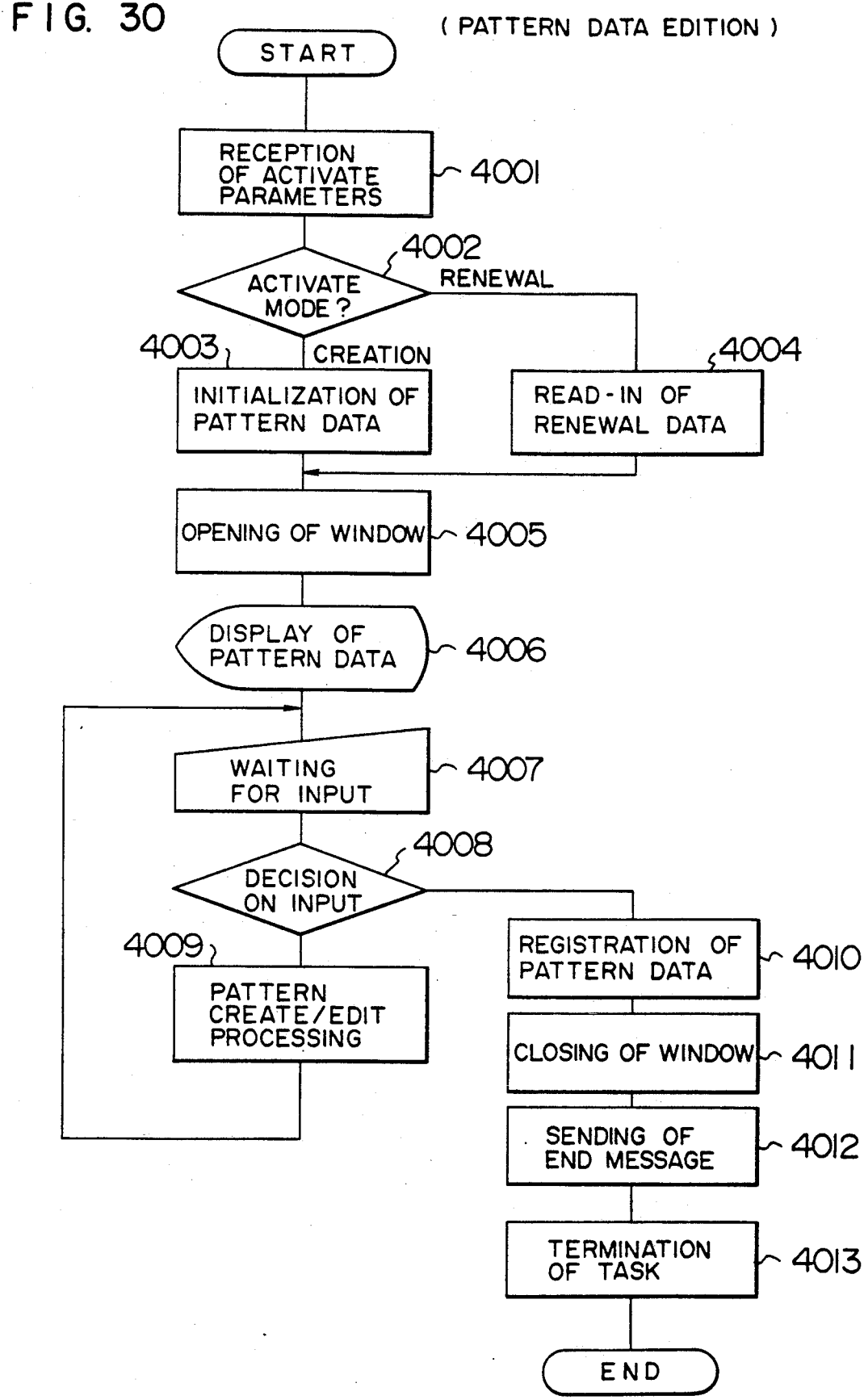

WINDOW MANAGEMENT APPARATUS FOR A DOCUMENT CREATING APPARATUS

This application is a continuation of application Ser. No. 122,783 filed on Nov. 19, 1987, abandoned.

BACKGROUND OF THE INVENTION

The present invention relates to a document creation apparatus which is advantageously suited for creating and editing documents in which there coexist plural types or species of descriptive element data, such as text data, graph data, pattern data, image data and other data.

In recent years, the document creating apparatus exemplified by a word processor tends to be imposed with such a requirement that the apparatus should be capable of coping with various species of descriptive element data such as graph, pattern and the like data in addition to the text (character) data. Since these descriptive elements of different types are edited with data formats differing from one to another data, creation and editing of a document in which a plurality of different type data coexist mixedly are conducted in such a manner in which a page layout for the document to be created is first displayed, wherein fields containing data to be edited on the layout are subsequently designated and the descriptive elements for the designated field are created and edited while displaying the elements on an area separated from that for the page layout, as is disclosed in JP-A-61-18036.

The hitherto known apparatus is however disadvantageous in that editing for one field can not be performed in parallel with editing for other field and the layout of other pages can not be referred to in the course of editing for a field on a certain page. Accordingly, when edit processing should be started for one field in the course of edit processing for another field, the later processing must be terminated previously. When the layout of the other page is to be referred to, the edit processing to this end has to be executed. Upon returning to the editing for the original field, a similar procedure must be followed. For these reasons, the document creating apparatus of the prior art involves a very troublesome procedure and manipulation in creating and editing the documents.

SUMMARY OF THE INVENTION

It is an ultimate object of the present invention to provide a document creating apparatus which can create and edit documents containing coexistently a plurality of different types of descriptive element through a much facilitated and simplified procedure.

For accomplishing the ultimate object mentioned above, the following objects are also contemplated by the invention.

Accordingly, another object of the invention is to simplify the procedure for editing selectively different species or types of descriptive element data.

Still another object of the present invention is to facilitate discriminative identification of relationships existing between a plurality of documents to be processed and descriptive element fields thereof.

A further object of the present invention is to simplify the procedure and manipulation for activating and ending data processing programs suited for the species or types of the descriptive elements to be created and edited.

A still further object of the invention is to facilitate recognition of descriptive element fields which are in the course of being created and edited.

A further object of the invention is to facilitate recognition of the descriptive element data field which can not be processed.

In view of the above objects, there is provided according to a general aspect of the present invention a document creating apparatus which includes input means for inputting on a field-by-field basis descriptive element data to be entered in a document in which a plurality of various species of the descriptive element data such as text data, graph data, pattern data, image data and other data coexist, storage means for storing the descriptive element data inputted through the input means and display means for displaying dot patterns on the basis of the various species of descriptive element data stored in the storage means, and which apparatus further comprises document edit means for causing the display means to display a page layout of a document to be created thereon and performing editing of the fields on the displayed layout in accordance with input information supplied from the input means, field edit means composed of a plurality of edit divisions provided in correspondence with the species of the descriptive element data, respectively, for creating and editing the descriptive element data within respective fields in accordance with input information supplied from the input means, activate means for activating relevant field edit means in accordance with the species of the description element data which are commanded for creation and renewal by the document edit means, and edit switching means for changing over the document edit means and the field edit means activated by the activate means without terminating the functions of both means.

BRIEF DESCRIPTION OF THE DRAWINGS

FIG. 12A is a view illustrating in a flow chart a processing executed by a system control

FIG. 13 is a view illustrating in a flow chart a processing executed by an input control section shown in FIG. 1;

FIG. 15 is a view illustrating in a flow chart a window opening processing;

FIG. 16 is a view illustrating in a flow chart a window closing processing;

FIG. 21 is a view illustrating in a flow chart a processing executed by a document edit section shown in FIG. 1;

FIG. 27 is a view showing a structure of support field edit management table;

FIG. 28 is a view showing a structure of target field table;

FIG. 29 is a view showing a structure of activated edit task managment table;

FIG. 30 is a view illustrating in a flow chart a processing executed by a pattern data edit section;

DESCRIPTION OF THE PREFERRED EMBODIMENTS

In the following, the present invention will be described in detail in conjunction with an exemplary embodiment thereof on the assumption that the invention is applied to a word processor.

Figure 1:
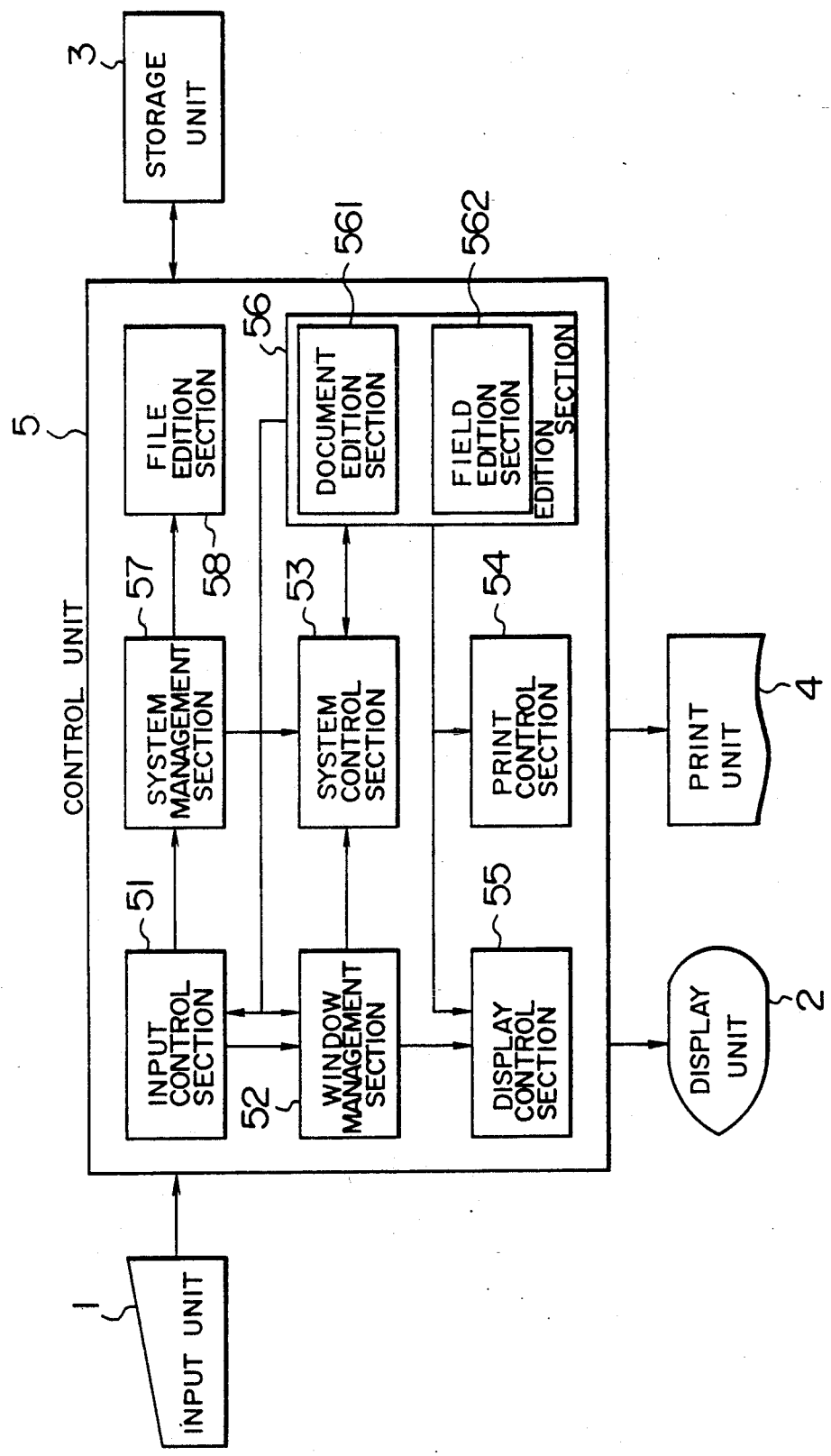
FIG. 1 is a block diagram showing a general arrangement of a word processor to which the present invention is applied.

FIG. 1 shows schematically in a block diagram a general arrangement of a word processor to which the present invention can be applied. In the figure, a reference numeral 1 denotes an input unit which includes a keyboard for inputting information such as characters or the like and a pointing device such as a mouse serving as a means for designating objects or targets to be processed, names of functions and others. A reference numeral 2 denotes a display unit constituted by a CRT display device for displaying characters, graphics and others, a numeral 3 denotes a storage unit constituted by a semiconductor memory, magnetic storage device or the like for storing contents or data of the created documents, descriptive element data, information (data) used for window management or manipulation described hereinafter and others, and a numeral 4 denotes a printer unit which may be constituted by a wire-dot printer or the like. A reference numeral 5 denotes generally a control unit constituted by a microprocessor or the like for controlling and supervising operations of the various units mentioned above. The control unit 5 includes an input control section 51, a window management section 52, a system control section 53, a print control section 54, a display control section 55, an edit section 56, a system management section 57 and a file edit section 58. In the case of the illustrative embodiment, processings for creation and edition of the documents are carried out by the edit section 56 which is composed of a document edit section 561 and field edit sections 562.

Figure 2:
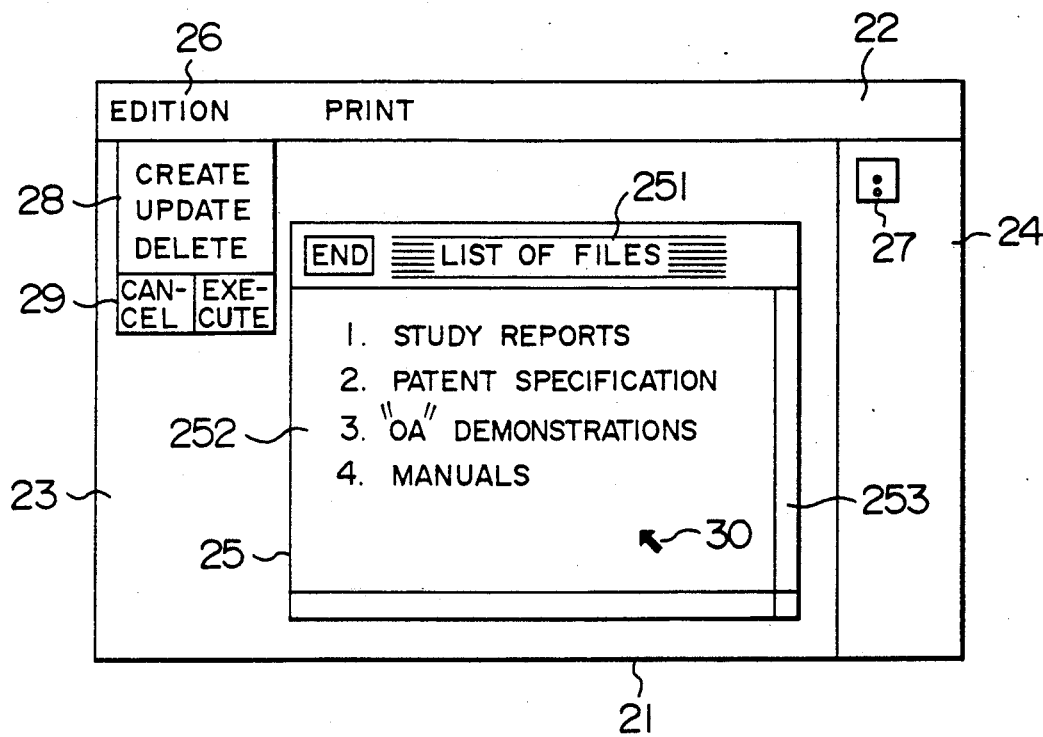
FIG. 2 is a view showing an example of screen display generated on a display unit.

FIG. 2 shows, by way of example, a screen image produced visibly on the display unit 2. The image generally denoted by a numeral 21 includes a menu area 22, an edition area 23 and an iconographic area 24. Each of the edit sections displays relevant data in the form of dot patterns within its own rectangular frame 25 (hereinafter referred to as a window) and performs edit processing of document data within the window separately from the others. In the menu area 22, the edit function classification/identification names (hereinafter referred to as pull-down menu names) 26 are displayed. When an operator designates a given pull-down menu name 26 with the aid of the mouse, a window associated with the designated function is established (which will hereinafter be termed as the opening of a window), and a detailed list 28 containing function items (hereinafter referred to as pull-down menu 28) is displayed. More specifically, the pull-down menu names 26 such as, for example, "edition", "print" and so forth are displayed on the menu area 22. When an operator selects or designates "edition" by means of the mouse, the pull-down menu 28 makes an appearance, whereby function items such as "create", "update", "delete" and others are displayed within the menu 28. In this state, an operator can select the desired function by designating the function item by means of the mouse, and the designated function is executed. A window denoted by a numeral 25 may include, for example, a caption area 251 destined for displaying the window name, a data area 252 for displaying data, and a control area 253 utilized by the operator for commanding an operation such as closing, moving, alteration of size or the like manipulation of the window. In an iconographic area 24, there are displayed iconographic characters (hereinafter referred to as icons for simplification) 27 which represent the programs for editing and other purposes. When an icon is selected under designation by the operator, the corresponding program is activated.

Figure 3:
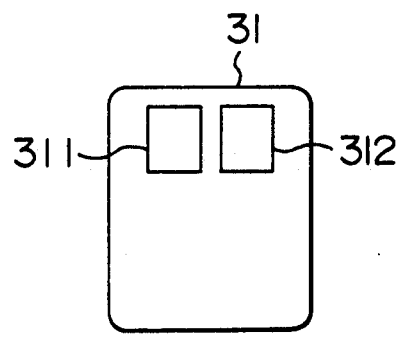
FIG. 3 is a view showing an array of mouse buttons.

Referring to FIG. 3, the mouse 31 is equipped with an execution button 311 for selecting the target or item to be subjected to the processing or manipulation, the function to be executed and others and a canceling button 312 for canceling the item or target selected for the processing or manipulation. Of course, the mouse 31 incorporates switches interlocked with the buttons mentioned above, although not shown. A mouse cursor 30 as displayed can move on the image screen by following the operator's manipulation to move the mouse 31 and is used for designating the displayed item or target for the processing.

Now, description will be turned to various parts or sections which constitute the control unit 5.

Figures 4, 5:
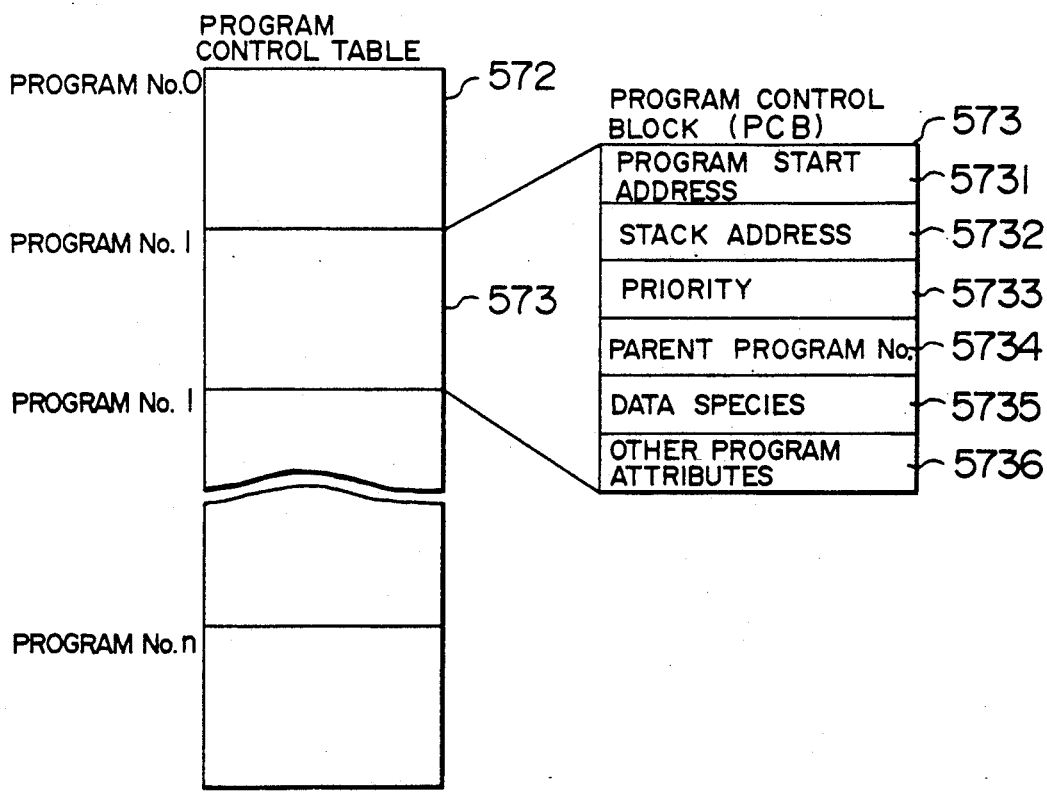
FIG. 4 is a view showing a structure of icon management table.
FIG. 5 is a view showing a structure of program control table.
Figures 6, 7:
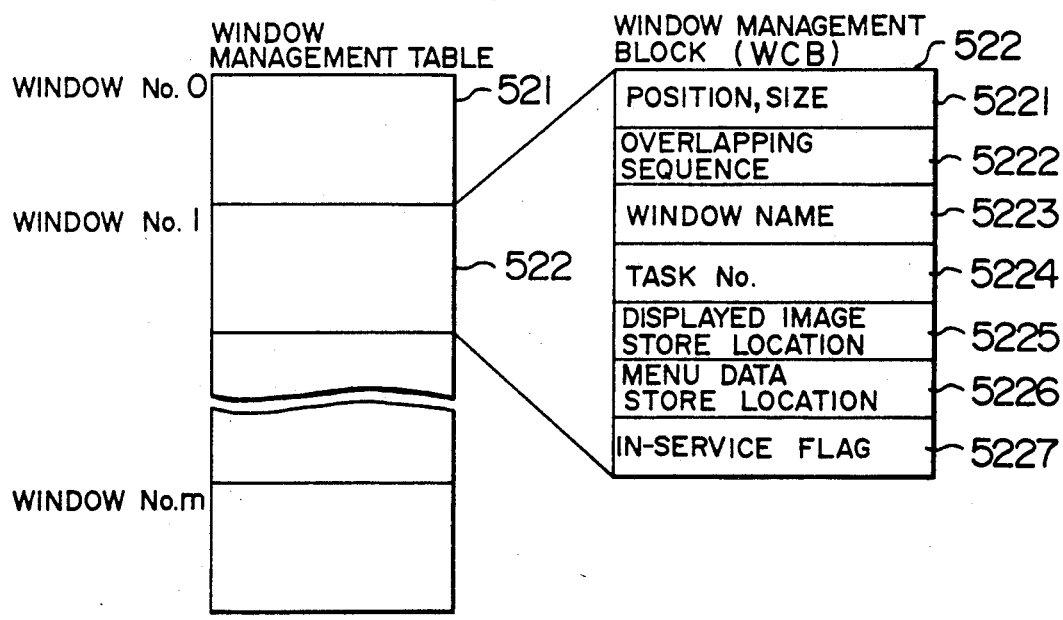
FIG. 6 is a view showing a structure of data name definition table.
FIG. 7 is a view showing a structure of window managment table.

The system management section 57 activates programs such as, for example, the program for the file edit section 58, the document edit section 561 or others in correspondence to the icon information furnished from the input control section 51. Correspondence relation existing between the icons and the programs are managed with the aid of an icon management table 571 in which icon numbers (No.) and corresponding program numbers (No.) are stored, as illustrated in FIG. 4. The program numbers are program identification numbers assigned to the individual programs, respectively. Each of the programs is managed by means of a program control table 572 shown in FIG. 5. As will be seen in FIG. 5, the program control table 572 stores therein program control blocks (hereinafter also referred to as PCB in abbreviation) 573 which are arrayed in a sequence coinciding with the order of the program numbers. Each of the program control blocks or PCB 573 stores therein program start address information 5731 of the corresponding program, a stack address 5732, priority level information 5733, a parent program number 5734, data species (or type) information 5735 and other program attribute information 5736. The parent program number 5734 designates an origin program by which the associated program is activated. The data species (or type) information 5735 indicates the species of data such as text, graphics, pattern or the like which the associated program is destined to handle and each contains a data number (No.). On the other hand, names corresponding to the data numbers are stored in a data name definition table (hereinafter also referred to as DNDT in abbreviation) 574 in a manner illustrated in FIG. 6.

Turning back to FIG. 1, the file edit section 58 operates to display within the associated window a list of documents stored in the storage unit 3 and performs edition of a document designated by an operator. With the phrase "edition of document", it is intended to encompass alteration or update, deletion, printing and other operations in general.

The document edit section 561 displays within the window the layout of a page of a document which is commanded to be created or altered (updated) by the file edit section 58 and performs edition of fields on the displayed page. With the phrase "edition of field", "field edition" or "field based edition" it is intended to cover in more general terms the creation, alteration (update), deletion, movement, copying and others of elementary data within a field.

The field edit section 562 displays within a window the content of the field for which creation, alteration (update) or the like operation is commanded by the document edit section 561 and performs creation and edition on the data located within the designated field. The field edit section 562 includes a variety of edit subsections in correspondence to the data species, respectively. By way of example, there can be mentioned a text data edit subsection (also referred to simply as the section), graph data edit subsection and graphics (pattern) data edit subsection.

Once creation of document has been initiated, the one of the edit sections mentioned above which can participate in the creation of document is always indicated in the topmost one of the windows displayed on the screen. For indexing a window at the topmost position, i.e. for the exchange of the edit sections, the mouse cursor 30 is moved onto the desired window as displayed and the execution button 311 is pressed. Alteration of the overlapping sequence of the window as commanded by the operator is performed by the window management section 52.

In addition to the alteration of the overlapping sequence of the windows, the window management section 52 serves to open or close the window on the screen in accordance with the request issued by the edit section. The window opened on the display screen is managed with the aid of a window management table 521 shown in FIG. 7. The window management table 521 stores window management or control blocks 521 (hereinafter also referred to as WCB in abbreviation) 522 arrayed in the order of the window numbers. Further, each of the window management blocks or WCBs 522 stores information mentioned below.

WINDOW LOCATION AND SIZE INFORMATION 5221

This information consists of an upper left x-coordinate, an upper left y-coordinate, a lower right x-coordinate and a lower right y-coordinate of a window on the assumption that the origin of the coordinate system is located at the topmost and leftmost point.

WINDOW OVERLAP SEQUENCE INFORMATION 5222

When a plurality of windows are opened on the image screen, this information indicates in what order the windows are sequenced.

WINDOW NAME INFORMATION 5223

This information represents the window name to be displayed in a caption area 251 of the window 25.

TASK NUMBER INFORMATION 5224

This information represents the identification number of the task which has set the window of concern. Each of the edit sections is created through a task, wherein the task number is allocated by the system control section 53 described hereinafter whenever the edit section is created as the task.

STORAGE LOCATION INFORMATION 5225 FOR THE IMAGE TO BE DISPLAYED IN WINDOW

A window display buffer is provided for each of the windows to store the image data to be displayed in the associated window. More specifically, the storage location information 5225 of the image data to be displayed within a window represents the location of the associated window display buffer. This information is utilized for recovering a portion of the image which is hidden underneath a window at the time when the window overlapping sequence is to be altered.

MENU DATA STORAGE LOCATION INFORMATION 5226

This information represents the storage address of menu data to be displayed in the menu area 22 and the pull-down menu area 28.

IN-SERVICE FLAG INFORMATION 5227

This information represents whether the WCB 522 is in service or not.

On the basis of the information mentioned above, the window management section 52 performs operations such as alteration of overlapping sequence of the windows as well as opening and closing thereof. When the overlapping sequence is to be altered, the window management section 52 requests the system control section 53 to interrupt the edit operation performed until then and reinitiate the edition for the designated window by making use of the aforementioned task number 5224. Additionally, the window management section 52 requests the input control section 51 to display the menu corresponding to the window located at the topmost position through the window operation described above in accordance with the aforementioned menu data storage position information 5226.

Figure 8:
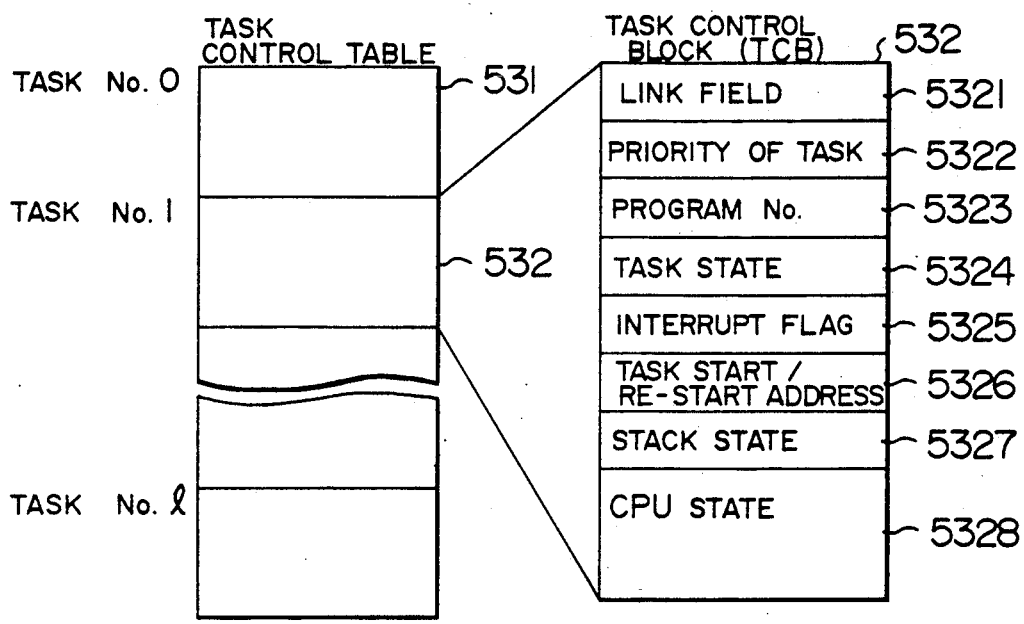
FIG. 8 is a view showing a structure of task control table.

The system control section 53 performs the control operation such as interruption and reinitiation (or restart) of the corresponding tasks in response to the request issued by the window management section 52. Additionally, the system control section 53 serves to create as the task an edit section in accordance with the request issued by a certain edit section, activate the task corresponding to an edit section requested by the certain edit section and performs a task end processing corresponding for the edit section requested by the certain edit section. Furthermore, the system control section 53 performs processing for sending messages to an edit section of concern in accordance with the request issued by a certain edit section for thereby allowing information transfer among the tasks as well as reception of the message transmitted from the edit section of concern. Each task is managed with the aid of a table referred to as the task control table 531 and shown in FIG. 8. The task control table 531 contains task control blocks (hereinafter referred to as TCB in abbreviation) 532 arrayed in the order of the task numbers, wherein one task is assigned with one TCB 532, which contains all information necessary for initiation and reinitiation or restart of the task, as mentioned below.

LINK FIELD INFORMATION 5321

This information is utilized for connecting or linking the TCB 532 to the list.

TASK PRIORITY LEVEL INFORMATION 5322

This information represents the priority level of the task upon execution thereof.

PROGRAM NUMBER INFORMATION 5323

This information represents the number of the program by which a relevant task was created.

TASK STATUS INFORMATION 5324

This information indicates the status the task assumes currently.

INTERRUPT FLAG INFORMATION 5325

This information indicates the presence of request for interruption of task.

TASK START/RESTART ADDRESS INFORMATION 5326

This information represents the addresses at which execution of task was started or interrupted.

STACK STATUS INFORMATION 5327

This information represents the position of the stack at which task is interrupted.

CPU STATUS INFORMATION 5328

This information includes all register contents at the time point when task is interrupted.

As the task status indicating information, the following can be mentioned.

NONEXISTENT (NONEXISTENT) STATE

This information indicates the state in which no program exists as a task. In that case, the task number corresponding to the associated TCB is in the non-used state.

DORMANT (DORMANT) STATE

This information indicates the state in which a program exists as a task but remains inhibited from execution.

READY (READY) STATE

Assigning of a CPU to a task indicates a state capable of excuting a program. A portion which assign the task to the CPU is referred to as the task dispatcher.

RUNNING (RUNNING) STATE

This information indicates the state in which a program for a task is being executed.

WAITING (WAITING) STATE

This information indicates the interrupted status in which execution of a task is held pending until a certain event occurs. By way of example, there can be mentioned a message reception waiting state in which the execution of a task is held pending until a message is furnished and an input/output completion waiting state in which the execution of a task is held pending until input/output operation has been completed.

Figure 9:
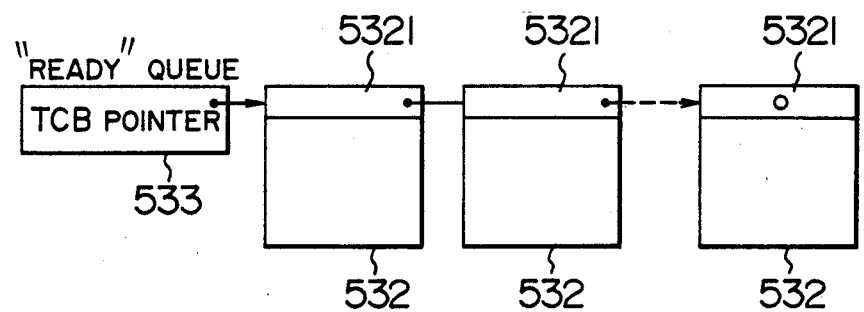
FIG. 9 is a view showing a link structure of a READY queue.

The tasks in the READY state are managed, for example, by linking the corresponding TCB to one list in the order of priority levels allocated to these tasks, as is shown in FIG. 9. This list is referred to as READY queue. The READY quene has a header 5333 in which a pointer to the TCB corresponding to the task in the READY state and allotted with the highest priority level is stored, while in a link field 5321 of the aforementioned TCB, there is stored a pointer to the TCB corresponding to the task of the next high priority level. In this manner, the TCBs are linked together by the pointers in the order of the allotted priority levels, wherein the link field of the final TCB contains information indicating that the corresponding task is located at the trail or end. The task dispatcher allocates to the CPU the task corresponding to the TCB having the highest priority level from those linked to the READY queue.

The tasks in the WAITING state are managed by linking them to respective lists prepared for each of the factors which set the corresponding TCB in the WAITING state, wherein the TCB is released from the associated list upon releasing of the WAITING state in response to occurrence of a certain event and linked to the READY queue, whereupon the execution of the task is reinitiated by the task dispatcher, starting from the interrupted position.

Figure 10:
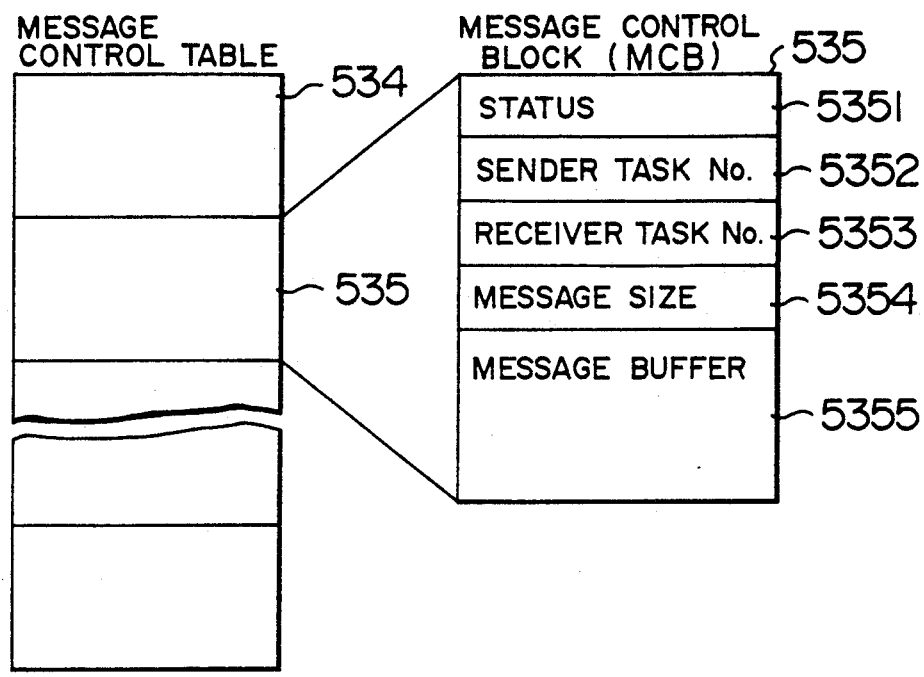
FIG. 10 is a view showing a structure of message control table.
Figure 11:
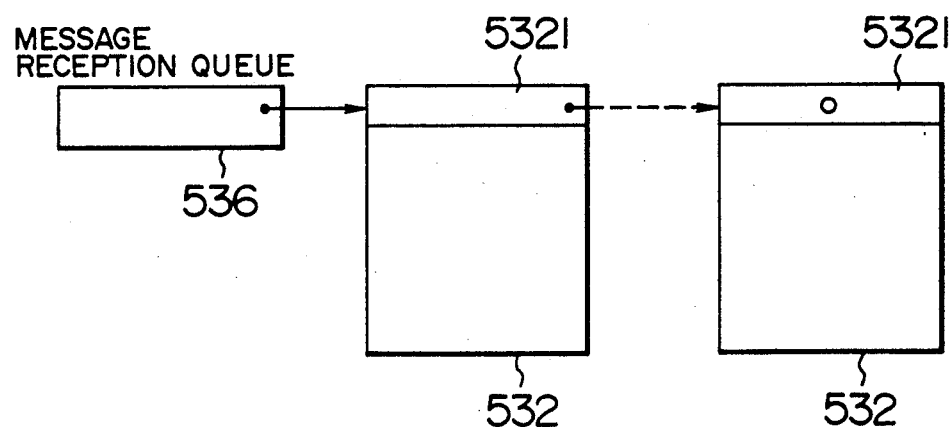
FIG. 11 is a view showing a message reception queue.

The messages are managed by a message control table 534, as shown in FIG. 10. The message control table 534 is constituted by an array of message control blocks (hereinafter referred to as MCB in abbreviation) 535, wherein one MCB 535 is allocated to one message. The MCB 535 includes, for example, status information 5351 indicating whether the associated MCB 535 is being used or not, a sender task number 5352, a receiver task number 5353, message size information 5354 and a message buffer 5355 for holding temporarily the incoming message. On the other hand, when it is found from the parameters intervening in the issue of the message reception request that no message is yet sent from the task to which the message reception request has been issued, the TCB 532 corresponding to the addresser task issuing the message reception request is decoupled from the READY queue and linked to a message reception waiting queue 536 shown in FIG. 11, to thereby place the task of concern in the WAITING state until the message is received. Alternatively, instead of placing the message reception requesting task in the WAITING state, information to the effect that the message is not sent out may be transmitted to that task.

Now, the processing flow taking place in the system control section 53 will be described by referring to FIG. 12. When a processing request is issued by a task to the system control section 53, environments for execution existing at that time point are saved in the TCB 532 (steps 1001). Subsequently, functions as requested are discriminatively identified (step 1002), being followed by activation of processing programs corresponding to the individual functions, respectively, (steps 1003 to 1008). After completion of the processings corresponding to the individual functions, it is decided on the basis of the state, for example, of the READY queue whether the task is to be exchanged with another (step 1011). If the answer of the decision step 1011 is affirmative (Y), the task dispatcher is activated (step 1013). Otherwise, the environments of execution saved at the step 1001 are recovered from the TCB 532 (step 1012), whereupon execution of the task issued the processing request is re-started (step 1012). On the other hand, upon issuing of input/output completion interrupt from the input/output unit, environments of execution at that time point are saved in the TCB 532 (step 1009). Subsequently, input/output completion processing such as, for example, transfer of input character or text codes or the like to an input requesting task is performed to thereby release the latter from the input waiting state (step 1010), being then followed by activation of the task dispatcher (step 1013). The task dispatcher makes a decision as to whether the TCB is linked to the READY queue or not (step 1191), as is shown in FIG. 12K. Unless the TCB is linked to the TCB, an endless loop is established until an interrupt is issued (step 1197). Otherwise, the TCB of the highest priority level is derived by referring to the pointer stored in the header 533 of the READY queue, and it is decided from the TCB interrupt flag information 5325 whether interrupt request to the task has been issued or not (step 1192). If the interrupt request is issued, the pointer is updated to decouple the TCB of concern from the READY queue (step 1193), and the processing is again executed starting from the step 1191 to thereby set the TCB of concern to the active (ACTIVE) state (step 1194), whereupon the environments of execution are restored from that TCB (step 1195), being followed by the restart of execution of the corresponding task (step 1196).

Figure 12B:
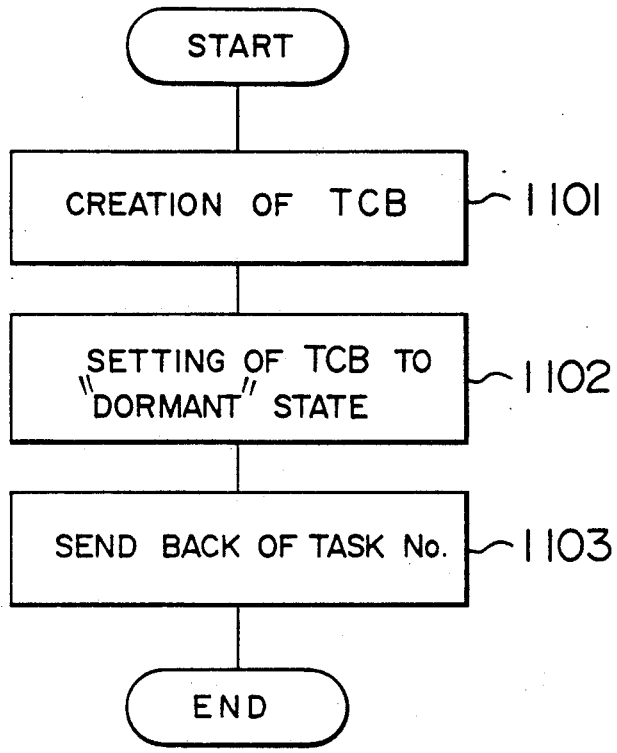
FIG. 12B is a view illustrating in a flow chart a task creating processing.
Figure 12C:
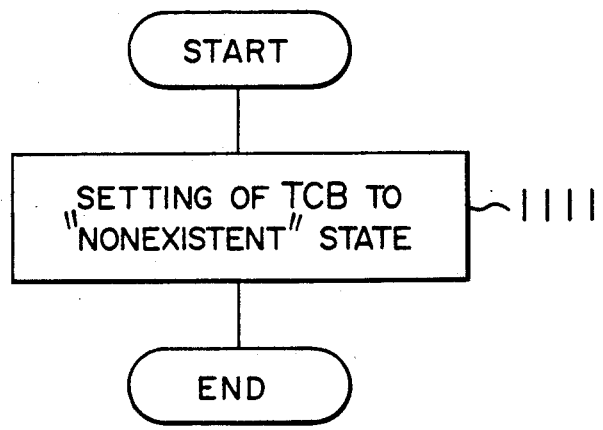
FIG. 12C is a view illustrating in a flow chart a task deletion processing.
Figure 12D:
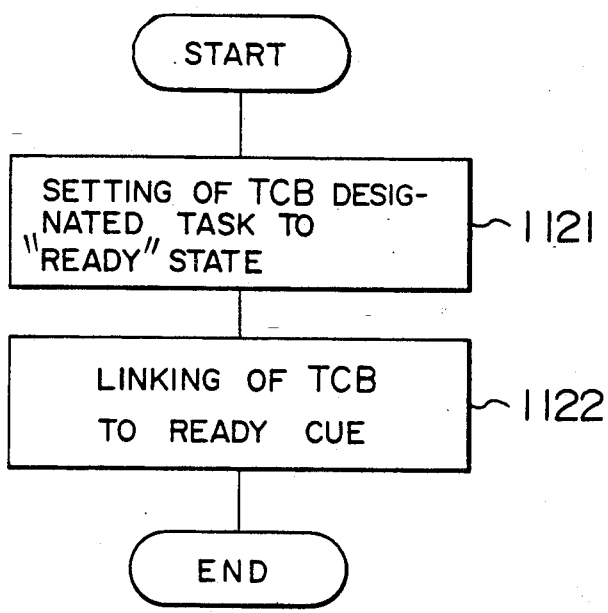
FIG. 12D is a view illustrating in a flow chart a task activation processing.
Figure 12E:
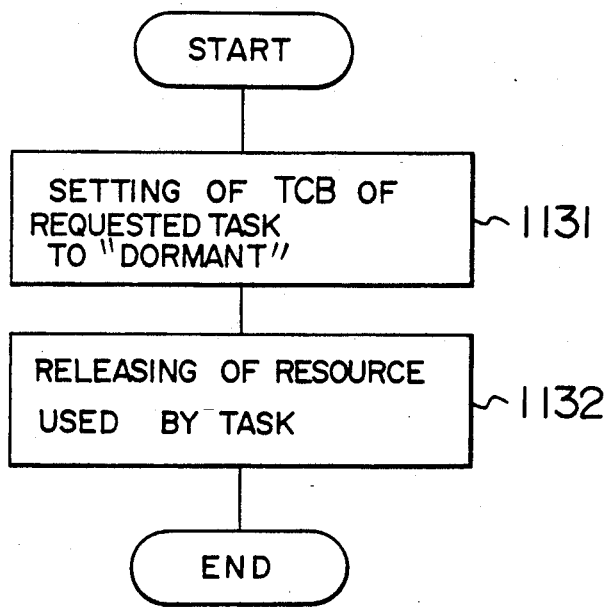
FIG. 12E is a view illustrating in a flow chart a task termination processing.
Figure 12F:
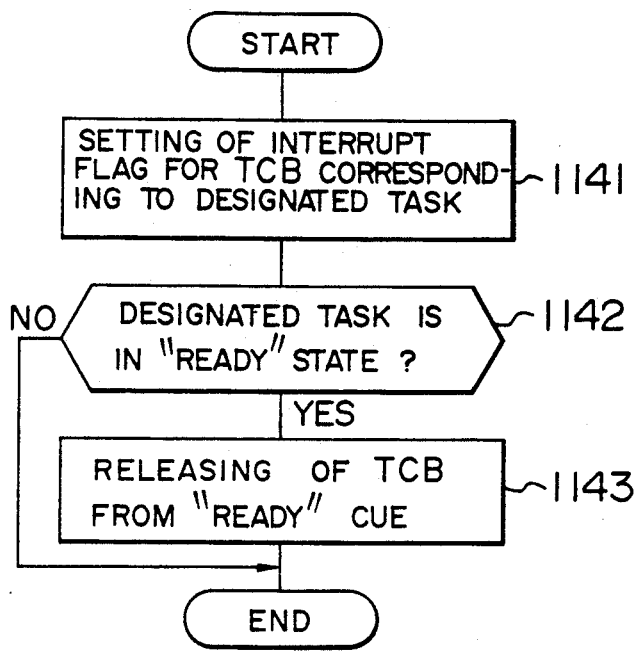
FIG. 12F is a view illustrating in a flow chart a task interruption processing.
Figure 12G:
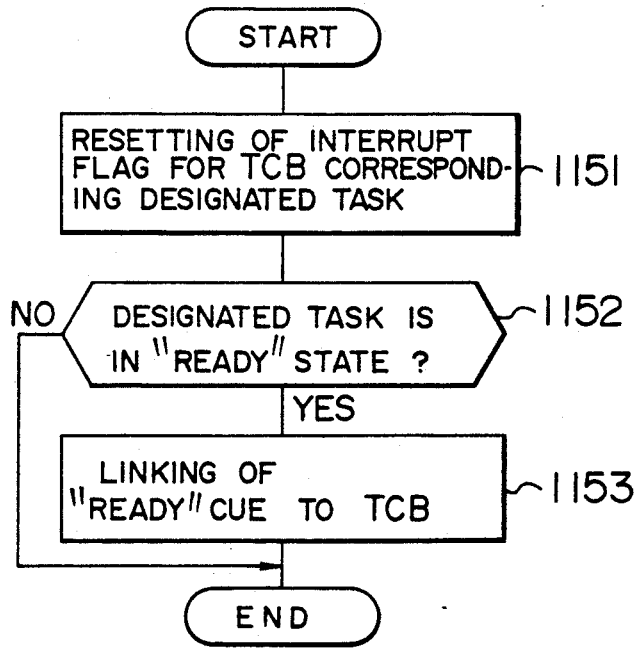
FIG. 12G is a view illustrating in a flow chart a task re-start processing.
Figure 12H:
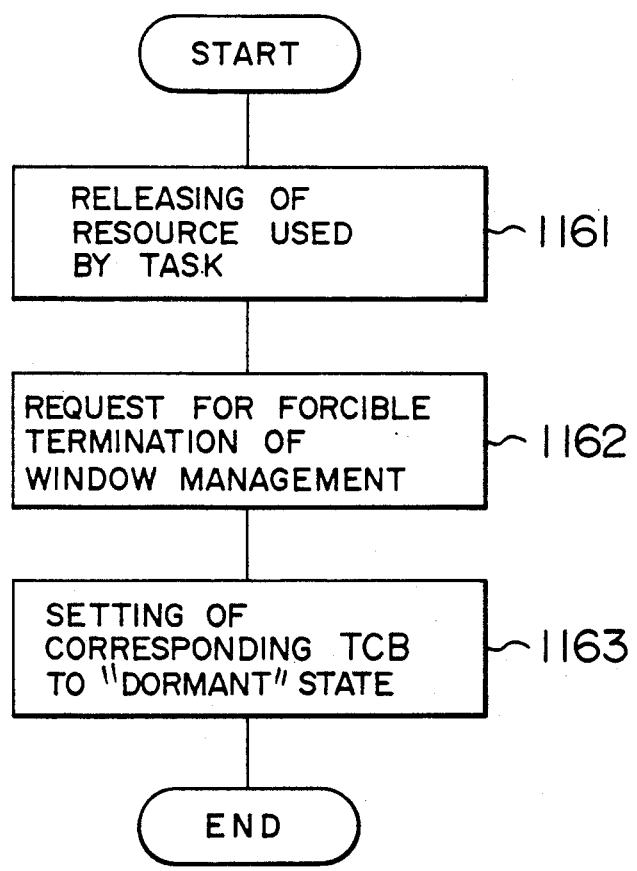
FIG. 12H is a view illustrating in a flow chart a forcible task termination processing.

As the functions required for the system control division 53, there may be mentioned, for example, task creation/deletion processing (step 1003), task activation/termination processing (step 1004), forcible task termination processing (step 1005), task interrupt/restart processing (step 1006), inter-task message transmission/reception processing (step 1007) and input/output request processing (step 1008), as shown in FIG. 12A. In the input/output request processing 1008, the input/output request issued by a task to the keyboard, the display unit or other is accepted, to thereby set the request issuing task in the WAITING state until the input/output processing has been completed while restoring the task of the WAITING state to the READY state upon completion of the input/output processing. Description in detail of the other processings shown in FIGS. 12B to 12J will be made later on.

The input control section 51 performs various functions such as transfer of character codes inputted through the keyboard and the coordinate values inputted from the mouse to the task, information of the designated icon to the system management section 57 in accordance with the area on the display screen 21 as designated by the mouse, information of the designated menu to the task, indication of the designated window change-over request to the window management section 52 and others.

Referring to FIG. 13, the input data from the input unit 1 is first analyzed at a step 1301 to decide whether the input data originates in the mouse. Unless the input data is from the mouse, this means that the input data originates in the keyboard, whereupon the character codes corresponding to the actuated or pressed keys are fetched or acquired (step 1311) and transferred to the input requesting task (step 1312). Assuming, for example, a character key labeled "あ" (a Japanese alphabetic character) in the keyboard is pressed by operator, then the character code corresponding to "あ" is transferred to the input requesting task. On the other hand, when the decision step 1301 shows that the input data originates in the mouse, coordinate indexing operation is performed to determine the location on the display screen that the operator has designated (step 1302), whereby the mouse cursor 30 is displayed at the position to which the mouse is moved (step 1303) When the decision step 1302 shows that the location designated by operator lies within other window than the topmost one, it is decided that the window change-over is commanded (step 1304), whereupon a window change-over request is issued to the window management section 52 (step 1305). In case the operator designation is directed to the icon field 24 (step 1305), it is decided which of the icons is designated (step 1305) to acquire the corresponding icon number (step 1313), which is then indicated to the system management section 57 (step 1314). Further, in order to allow the system management section 57 to retrieve the program corresponding to the icon as indicated from the icon management table 571 to thereby create the retrieved program as a task and activate the created task, a request for creation and activation of that task is issued to the system control section 53. When an item located within the topmost window is designated by the operator (step 1306), the coordinate value thereof on the display screen is translated into a relative coordinate value within the topmost window (step 1317), followed by a step 1318 where the coordinate value resulting from the translation is transferred to the input requesting task (step 1318). In case the item designated by the operator is found to lie within the menu area 22 (step 1307), a request is issued to the window management section 52 to open the pull-down menu (step 1315). When the item designated by the operator is located within the pull-down menu area 28 (step 1308), it is then determined which of the function items is designated, whereupon the number identifying the designated function item is transferred to the input requesting task together with the pull-down menu number (step 1319). When the item designated by the operator is located within the control area 253 or caption area 251 of a window (step 1309), a code indicative of the window closing, scrolling or the like is furnished to the input requesting task (step 1310). If the other area is designated, nothing is down. It should be noted that when the code is transferred to the input requesting task, the state of the latter is changed to the READY state from the WAITING state by the system control section 53.

Figure 14:
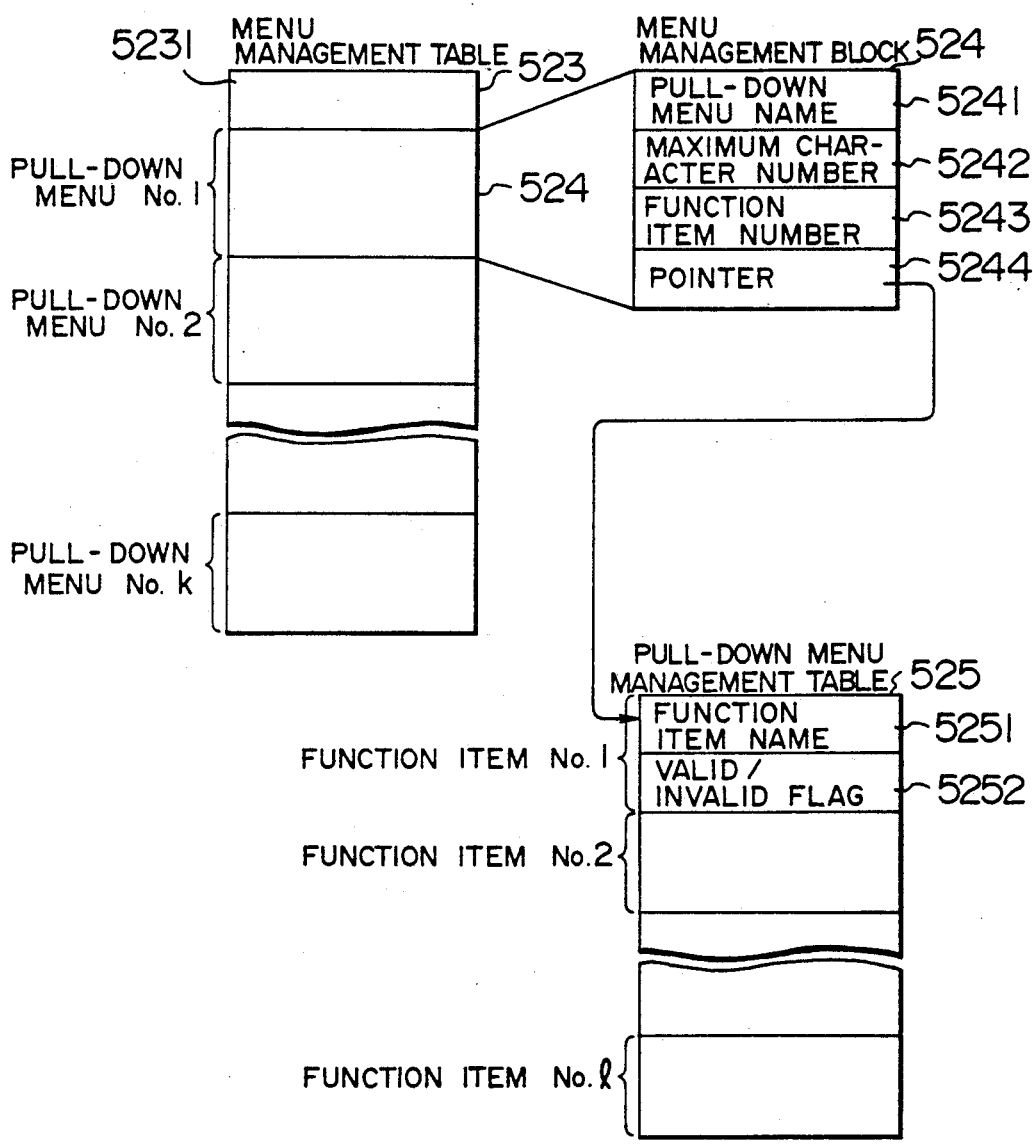
FIG. 14 is a view showing structures of menu management table and pull-down menu table together with relations existing therebetween.

The menu is placed under control or management of the menu management table 523 and the pull-down menu management table 525, both being shown in FIG. 14. The menu management table 523 contains therein the information of the number of pull-down menus and in succession thereto menu management blocks 524 arrayed in the order of the pull-down identification numbers (No.) in a number equal to that of the pull-down menus. Each of the menu management block 524 contains pull-down menu name 5241, a maximum character number of function item 5242, a function item number (No.) 5243 and a pointer 5244 to the pull-down menu management table 525. On the other hand, the pull-down menu management table 525 contains pairs of a function item name 5251 and a valid/invalid flag 5252 indicating whether the associated function item is valid or not, the pairs being arrayed in the order of the function item identification numbers (No.) in a number equal to that of the function items.

On the basis of the information mentioned above, the input control section 51 responds to the request issued by the window management section, if any, for displaying in the menu area the pull-down name of the window which occupies the topmost position upon opening or changing-over of the window. In case the pull-down name is designated by the mouse, the function item name is retrieved from the corresponding pull-down menu management table 525, whereby the retrieved function item is displayed in the pull-down menu area 28 with a normal brightness when it is valid, while being displayed with a half-brightness if the retrieved item is invalid.

The print control section 54 serves to control the printer unit 4 in response to the request for document print-out issued by the edit section 56. The display control section 55 responds to the display requests from the edit section 56 and the window management section 52 for writing the data only of a portion that can be displayed in the topmost window on the display unit 2 on the basis of the overlapping sequence information available from the window management block 522, said data being written on the dot basis in the memory dedicated for the display unit 2.

Creation and editing of a document by the word processor according to the illustrated embodiment of the invention will now be described.

At first, in the initial state, creation of a new document or editing of created documents is started, when operator designates the corresponding icon with the mouse.

Figure 18:
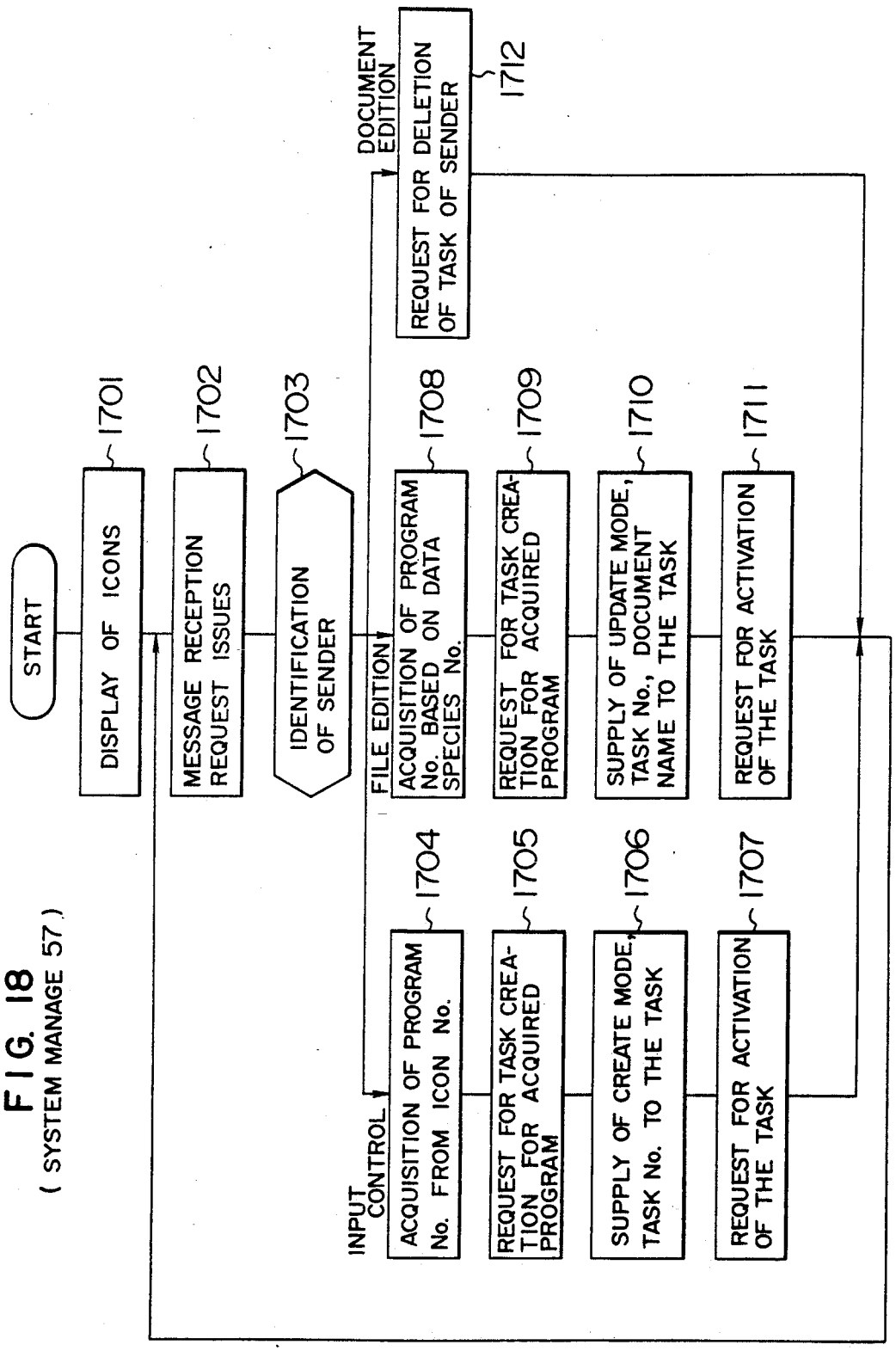
FIG. 18 is a view illustrating in a flow chart a processing executed by a system management section shown in FIG. 1.
Figure 20:
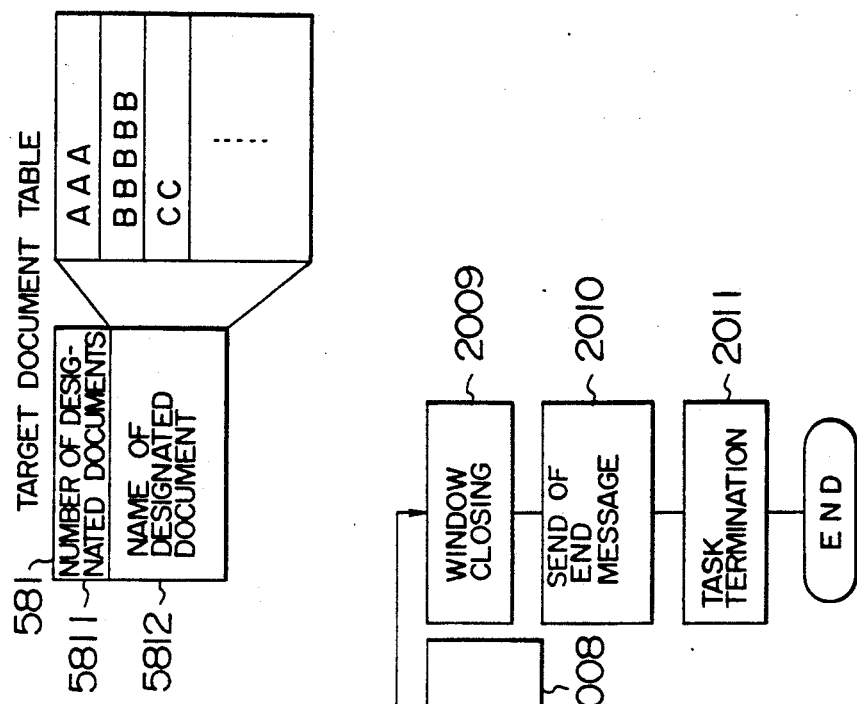
FIG. 20 is a view showing a structure of target document table.

The input control section 51 responds to the designation or command thus inputted by operator to identify the icon of concern on the basis of the designated coordinate position on the display screen, whereupon the identified icon number (No.) is informed to the system management section 57. On the other hand, referring to a flow chart shown in FIG. 18, the system management section 57 in its initial state first displays the icons (step 1701), issues a request for reception of message (step 1702), identifies the sender in which the received message, if any, originates (step 1703), acquires the program number (No.) corresponding to the designated icon with the aid of the icon management table 571 when the received message is from the aforementioned input control section 51 (step 1704), and creates the relevant edit section as a task, being followed by activation of the task (step 1705). The task creation and activation are illustrated in the processing flow charts in FIGS. 12B and 12D. Referring to the figures, when the system management section 57 issues to the system control section a request for task creation in the form of the program number (No.), the system control section 53 responds to that request by acquiring the non-used task number from the task control table and creating a corresponding TCB (step 1101), whereupon the task is set to the DORMANT state (step 1102) and the acquired task number is sent back to the request issuer (step 1103). Subsequently, when the system management section 57 issues the request for activation of the task by designating its task number, the system control section 53 sets the TCB corresponding to the designated task number to the aforementioned READY state (step 1121), whereupon the TCB is linked to the READY queue. Thus, the edit section assumes the state ready for execution (step 1122).

The transaction of information mentioned above is carried out through transmission/reception of messages through the medium of the system control section 53.

By way of example, in the case the message is transmitted from the input control section 51 to the system management section 57, the input control section 51 issues first to the system control section 53 a request for allowing the message to be transmitted to the system management section 57 (step 1706).

Figure 12I:
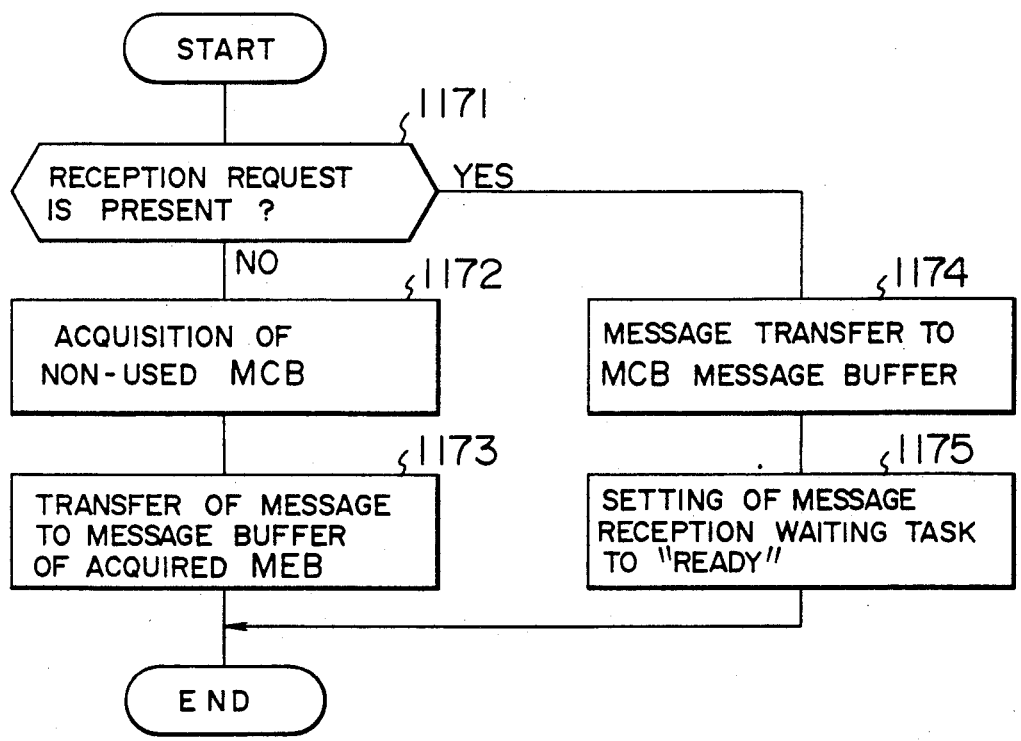
FIG. 12I is a view illustrating in a flow chart a message transmission processing.

In response, the system control section 53 makes decision as to whether the reception request is issued by the system management section 57 by consulting the message control table, as is shown in FIG. 12I at a step 1171. If the reception request is present, a transmission message is transferred to the message buffer of the corresponding MCB (step 1174) to perform the reception awaiting task, i.e. releasing of the TCB of the system management section 57 from the message awaiting queue and linking to the READY queue (step 1175). On the contrary, when no reception request is issued yet, the system control section 53 acquires a non-used MCB (step 1172) and transfers the message to the message buffer of the MCB (step 1173).

Figure 12J:
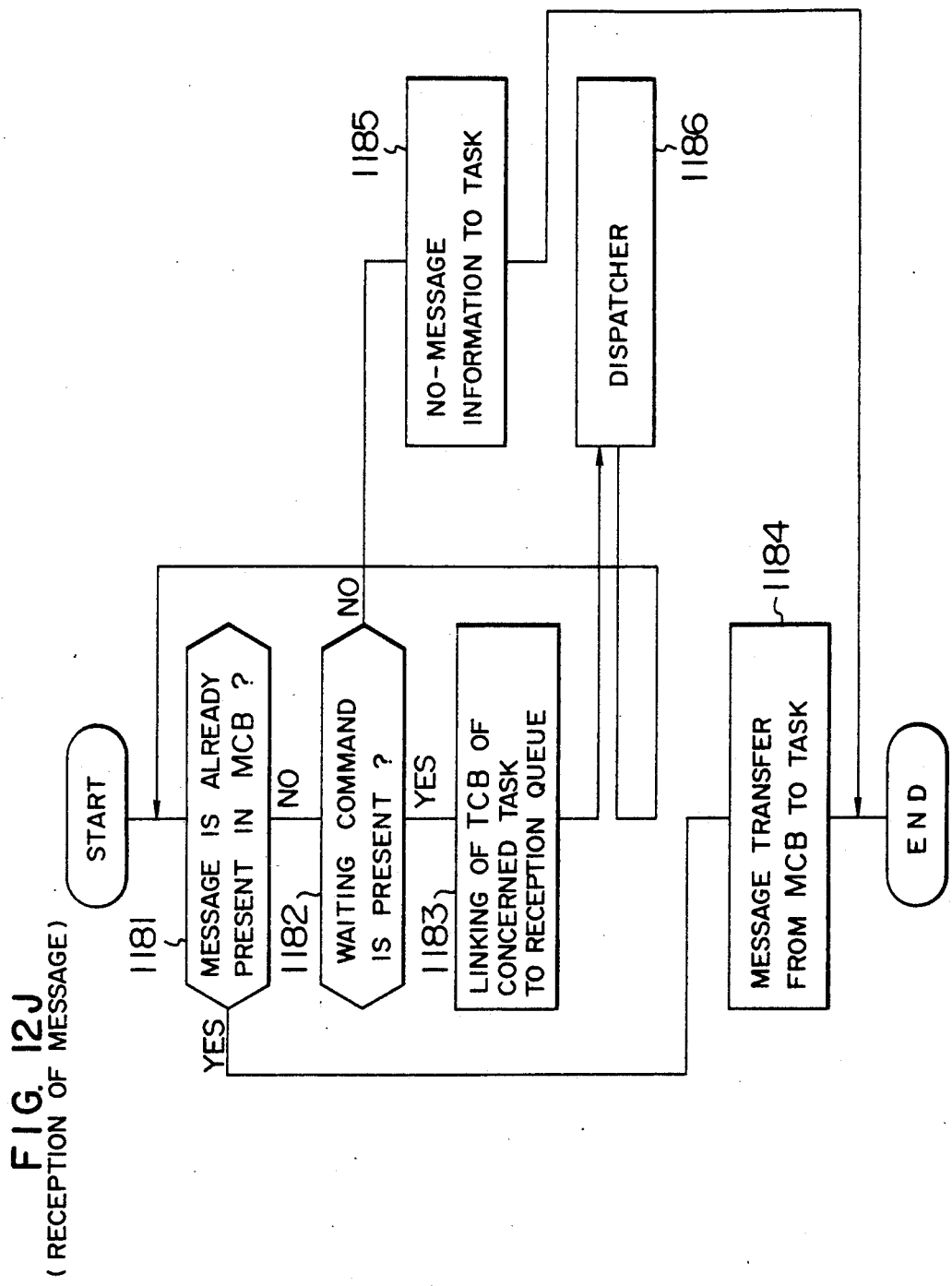
FIG. 12J is a view illustrating in a flow chart a message reception processing.
Figure 12K:
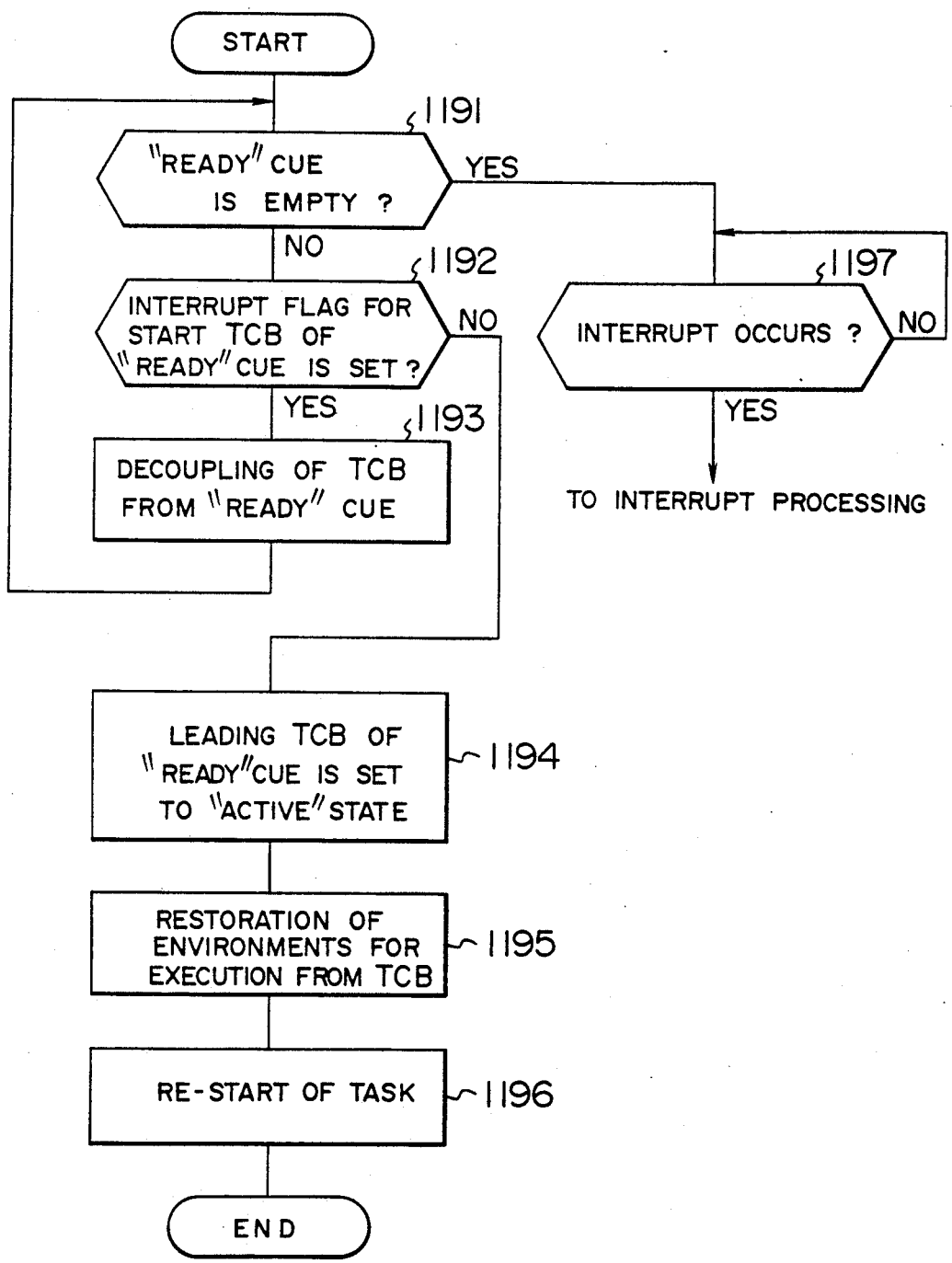
FIG. 12K is a view illustrating in a flow chart a processing executed by a dispatcher shown in FIG. 1.

On the other hand, when the system management section 57 issues the message request to the system control section 53, the latter makes a decision as to whether the message destined for the system management section 57 is present in the MCB, as shown in FIG. 12J at a step 1181. If present, the system control section 53 reads out the message from the MCB and transfers it to the system management section 57, the message request issuer (step 1184). Unless the message is present in the MCB of concern, a decision is made as to whether the task which has issued the macro of concern indicates the WAITING (step 1182). Unless the WAITING is indicated, information that no message has been found for that task is sent back to thereby allow the processing to be completed (step 1185). Otherwise, the TCB of that task is disconnected from the READY queue shown in FIG. 9 after acquisition of the non-used MCB and linked to the message reception awaiting queue 536, whereupon the control is transferred to the dispatcher (steps 1183 and 1186). In this manner, when the message is transferred to the MCB in response to the message transmission request, the task waiting for the message is linked to the READY queue. Thus, upon restating of the task of concern, execution is performed starting from the message reception processing, whereby the content (message) of the MCB can be received by the task.

When the operator command resides in the creation of a new document, the system management section 57 activates the document edit section 56. And, in case the operator command resides in editing the previously created documents, the system management section 57 activates the file edit section 58 to indicate the next document which is to undergo the edit processing.

Figure 19:
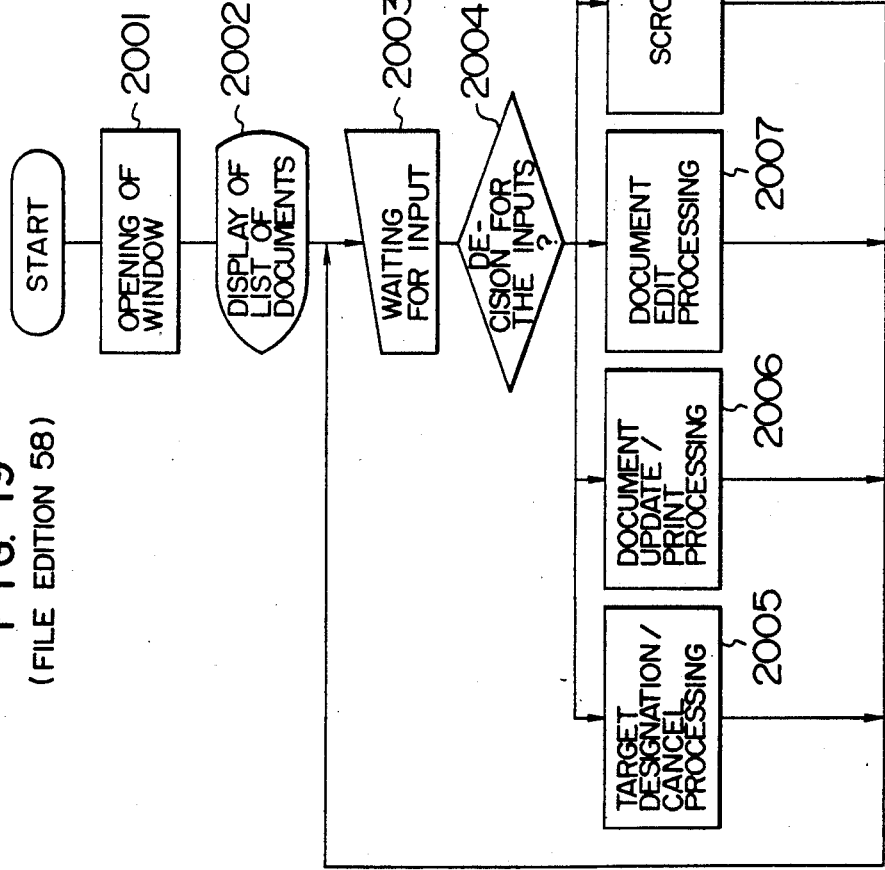
FIG. 19 is a view illustrating in a flow chart a processing executed by a file edit section shown in FIG. 1.

Next, the processing performed by the file edit section 58 will be described by referring to the flow chart shown in FIG. 19. The file edit section first opens a window (step 2001) and displays a list of documents stored in the storage unit 3 within the opened window (step 2002). After the display, the file edit section 58 requests the input control section 51 to input data or information, if any (step 2003). If the information is available, the content thereof is identified (step 2004). In this connection, when the information inputted by operator is of a document to be processed as designated by operation, a decision is made as to which of the documents is designated, whereupon the name of the designated document is registered in the relevant document table 581 (step 2005). The relevant document table 581 contains the numbers (No.) of designated documents 5811 and the designated document names 5812. On the other hand, when the renewal/printing is commanded by the operator, information that the renewal/printing command has been inputted is sent to the system management section 57 together with the name of the document currently subjected to the processing and the data species number (No.) corresponding to that document (step 2006). Further, in the case of the edit command such as copying or deletion for a document, the processing for copying or deletion of the document as designated is executed (step 2007). When the command is directed to the scrolling, a scrolling display for the list of documents is performed (step 2008). In the case of the task termination or end command, the window is closed (step 2009), and completion of the file edit processing is messaged to the system management section 57 (step 2010) while issuing the task end request (step 2011). In response to the task end request, the system control section 53 sets the TCB of the concerned task to the DOCUMENT state as shown in FIG. 12E at step 1131, to thereby release the resource used by the task (step 1132). The term "resource" is intended to encompass the memory and CPU.

The open/close processing mentioned hereinbefore is performed in the window management section 52, which will be described below in detail by referring to the flow charts shown in FIGS. 15 and 16.

In the first place, the window open processing will be described. The window management section 52 creates a WCB 522 in accordance with the information designated by a task (step 1501). At that time, it is also checked whether any window has been already opened (step 1502). If a window is present, the task which utilizes the window occupying the uppermost position currently is once interrupted (step 1503), and the displayed image within the uppermost window is saved in the display buffer (step 1504). Subsequently, a window is displayed in accordance with information of the position and size designated by the task of concern (step 1505). Further, the number (No.) of the created window management block is sent back to the request issuing task (step 1506).

In the case of the window closing procedure, the image within the designated window is first erased (step 1511). Subsequently, the window hidden by one subjected to the close processing is retrieved from the window management table, the display image is read out from the aforementioned display buffer, the display image for the window of lower rank than the erased one is restored (step 1512), and the WCB 522 for the erased window is reset to the non-used state (step 1513).

By the way, the task interruption processing mentioned above will be described in detail hereinafter.

As will be appreciated from the foregoing, when the operator command is to create a new document, the system management section 57 creates the document edit section 561 as a task in accordance with the information from the input control section 51 (step 1705) and subsequently activates the new document creation mode (step 1707). In the case of renewal of a created document, the system management section 57 acquires the relevant program number (No.) from the program control table (FIG. 5) in accordance with the data species number supplied from the file edit section 58 (step 1708), to thereby create the document edit section 561 as a task (step 1709), and furnishes the parameters required for activating the document edit section 561 (step 1710), to thereby activate the document edit section 561 in the renewal mode (step 1711).

Further, the system management section 57 executes deletion of the task upon reception of the end message from the very edit section that the system management section 57 has created and activated (step 1712). The task deletion processing is executed by the system control section 53 as in the case of the task creation request processing described above. As in the FIG. 12, the system control section 53 then sets the TCB corresponding to the designated task to the NONEXISTENT state (step 1111). In other words, the TCB is reset to the non-used state.

Upon activation of the document edit section 561, the system management section 57 transmits the aforementioned mode and the created task number (No.) to the document edit section 561 as the parameters. In the case of the update mode, the name of the document to be updated which name is furnished from the file edit section 58 is also sent to the document edit section.

Now, the processing performed by the activated document edit section 561 will be described by referring to flow charts shown in FIGS. 21, 22A to 22L.

Figure 22A:
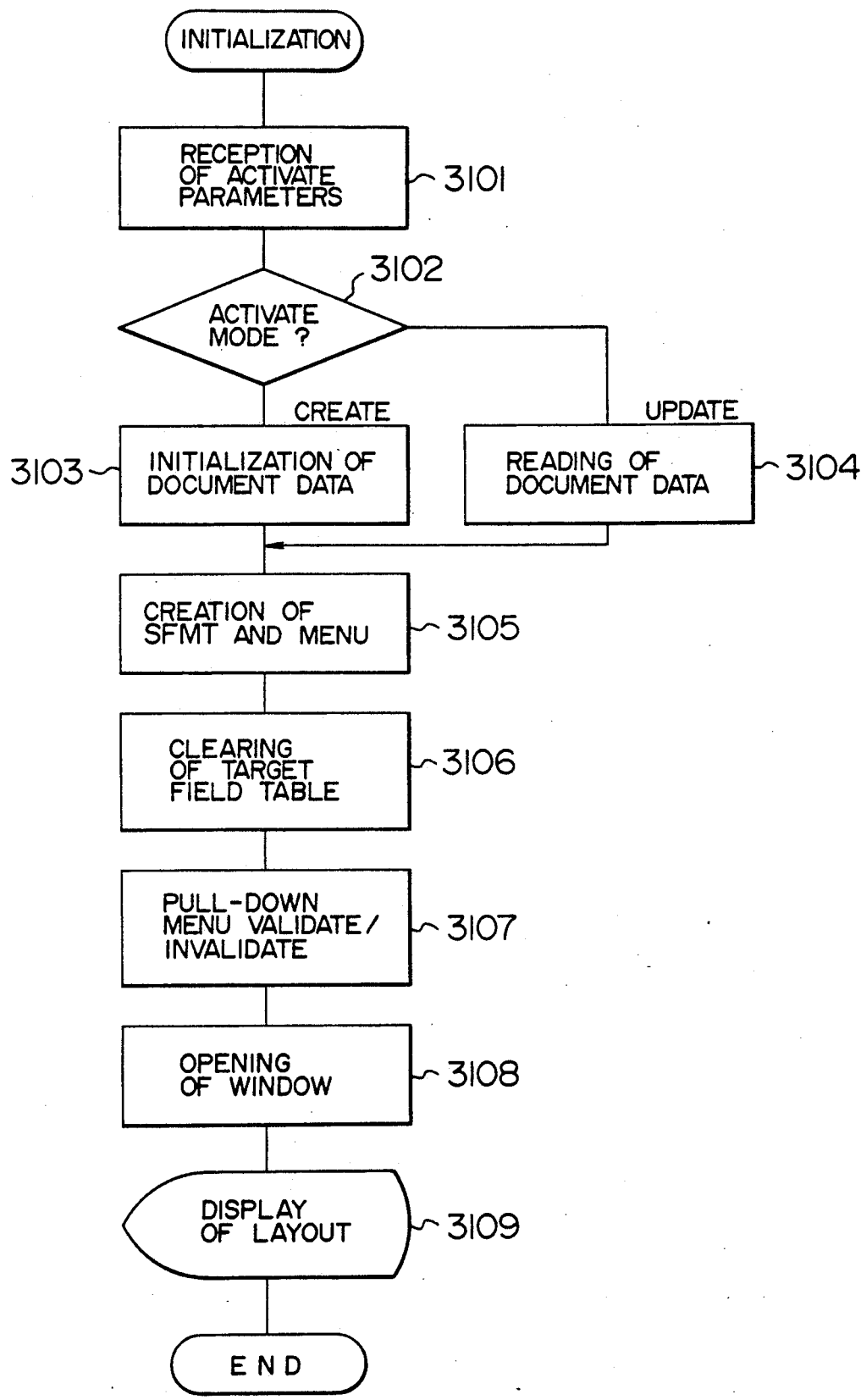
FIG. 22A is a view illustrating in a flow chart an initialization processing executed by the document edit section.

In the initialization processing (step 3001), the document edit section 561 receives the activating parameters in the form of message (step 3101) and makes a decision on the basis of the contents of the parameters as to which of the new document creation activating mode or the document update activating mode is to be established (step 3102), as illustrated in detail in FIG. 22A. In the case the new document is to be created, the textual data is initialized (step 3103), while in the case of the document update, data for the update is read out from the storage unit 3 in accordance with the document name designated by the parameter mentioned above (step 3104). The structure of the textual data will be described hereinafter. Subsequently, by consulting the program control table (FIG. 5), a support field edit section management table (hereinafter referred to as SFMT in abbreviation) is prepared which table contains a list of field edit sections capable of performing creation/renewal of fields in the document. More specifically, the SFMT holds in pair the program number (No.) 5682 of the support field edit section and the data species number (No.) 5683 of the field edit sections, and further includes the field edit section (No.) 5681, as is shown in FIG. 27. Additionally, in order to allow the operator to know the type of data for which the field can be created currently, the name of data for the aforementioned field edit section is set in the pull-down menu (step 3105). Subsequently, upon field edition described below, the designated field in a target field table indicating the field subjected to the processing (FIG. 28) is cleared (step 3106), being then followed by initialization of the pull-down menu data to the valid/invalid state (step 3107). The concerned field table holds the number of the fields (information denoted by 5684) designated currently as the targets for the processing, the types of the designated fields (5685) and the designated field numbers (No.) 5686, as shown in FIG. 28. Description concerning the types of the fields and change-over or switching of the pull-down menu between the valid/invalid states will be made hereinafter. Subsequently, the document edit section 561 opens a window (step 3108) and displays the layout of a first page of the document to be edited within the opened window in the manner illustrated in FIG. 31A (step 3109). In conjunction with the opening of the window, it should be mentioned that the window size is selected to be compatible with that of the printing sheet and the task number (No.) of the document edit section 561 is added as a part of the title of the window.

Now, description will be turned to the processing involved in creating the SFMT and the menu data briefed above in conjunction with the step 3105 shown in FIG. 22A.

As will be seen in FIG. 27, the SFMT is a table containing a list of the program numbers (No.) 5682 and the data species numbers (No.) 5683 for the field edit sections which can be activated by the document edit section. The information is employed in making decision as to whether the relevant program exists upon creation, update or layout displaying of a field, or used as parameters for creating the program as a task.

Figure 22B:
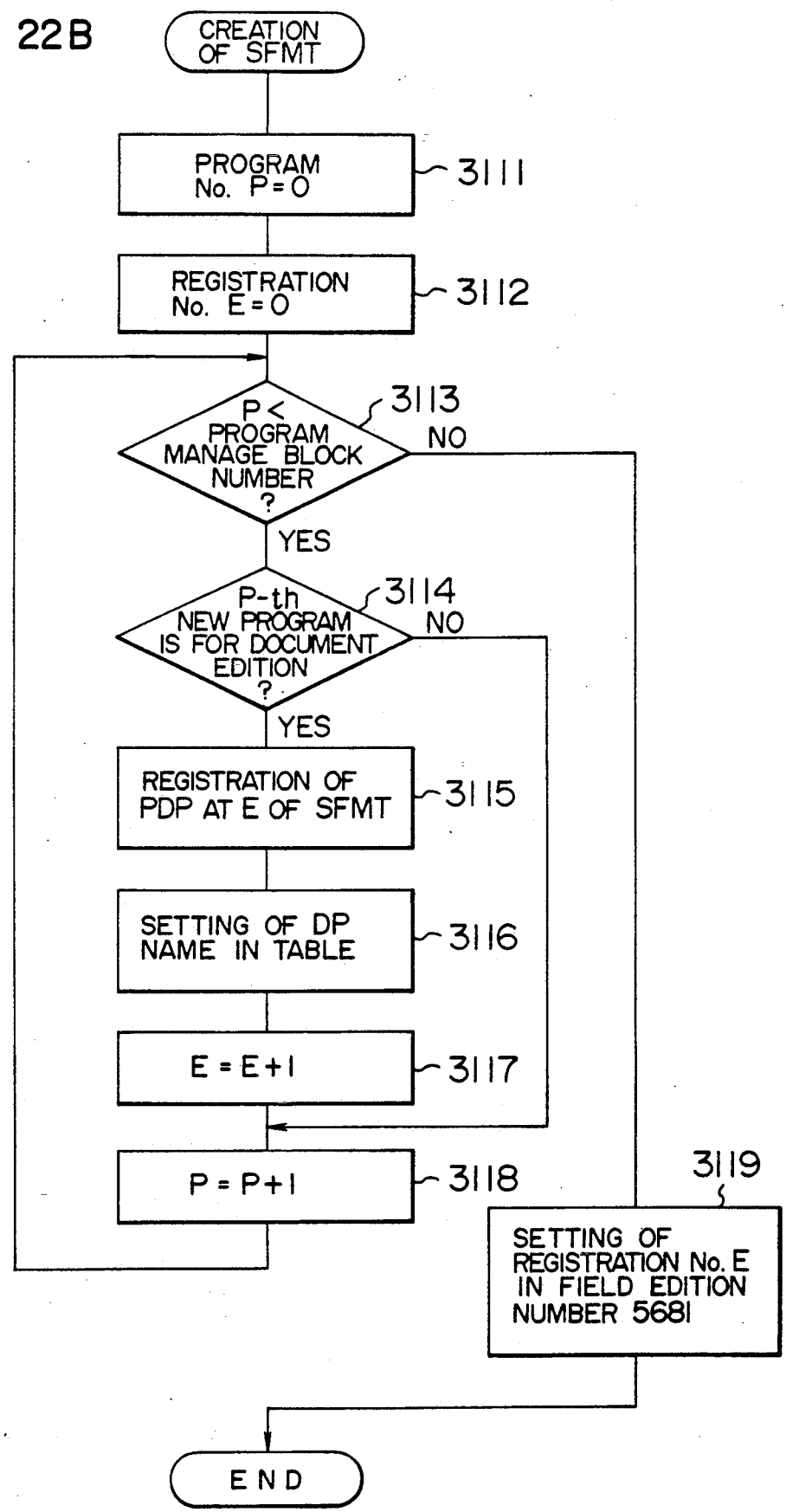
FIG. 22B is a view illustrating in a flow chart a processing for creating a support field management table in the initialization processing of the document edit section.
Figure 22C:
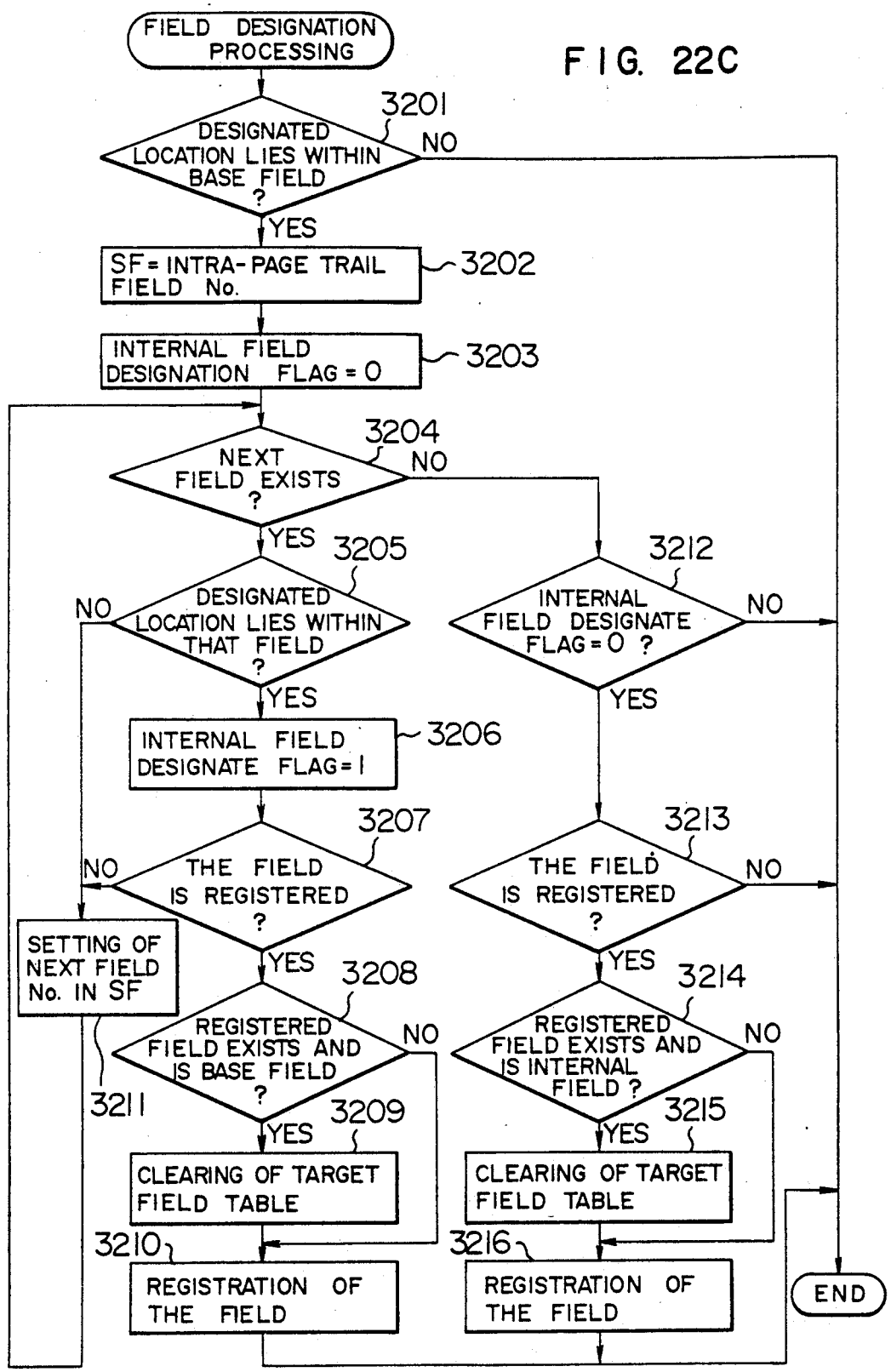
FIG. 22C is a view illustrating in a flow chart a field designation processing executed by the document edit section.
Figure 22D:
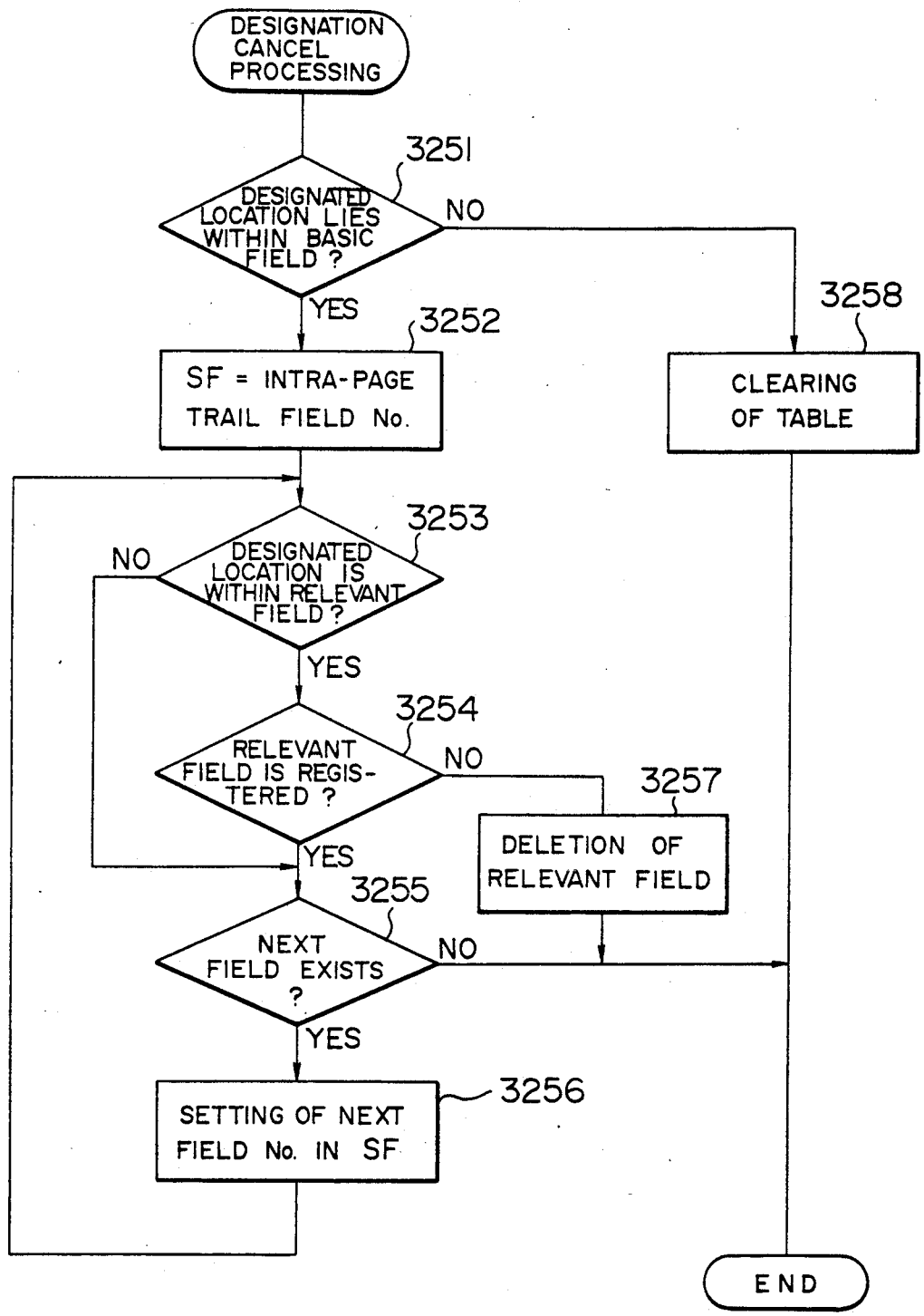
FIG. 22D is a view illustrating in a flow chart a designation cancel processing executed by the document edit section.
Figure 22E:
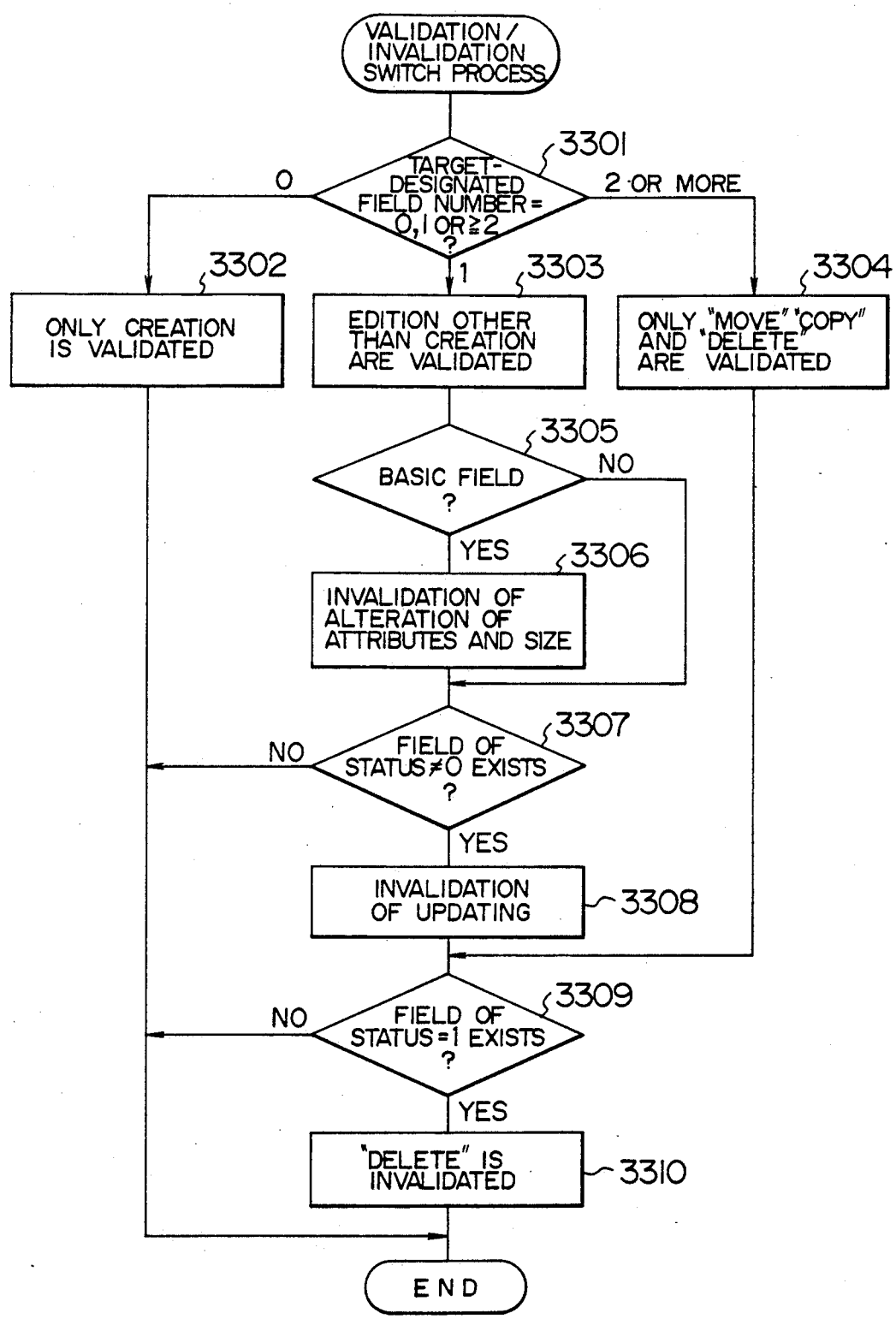
FIG. 22E is a view illustrating in a flow chart a pull-down menu validation/invalidation switching processing executed by the document edit section.
Figure 23:
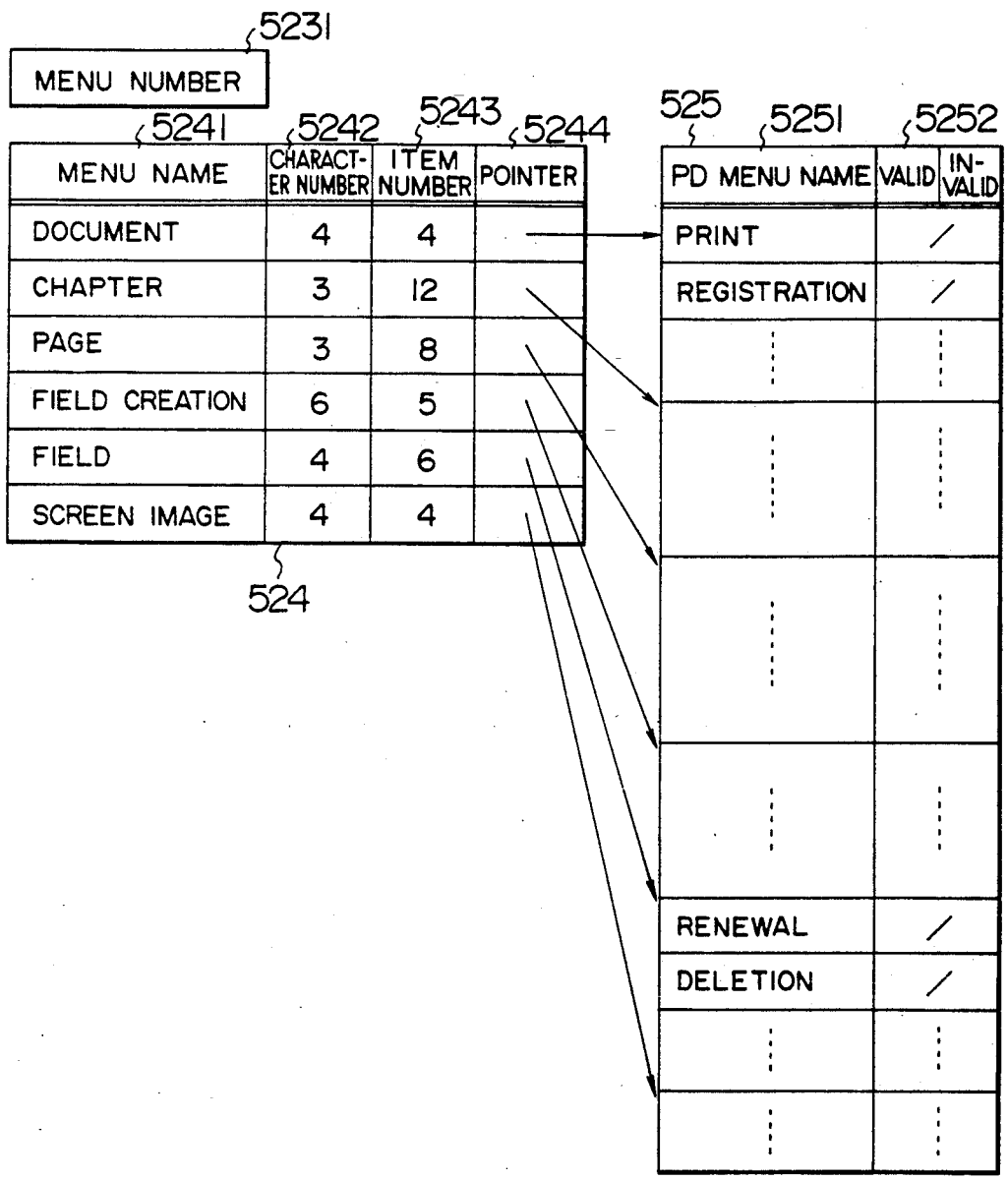
FIG. 23 is a view showing a structure of menu table for the document edit section.

In preparation of the table SFMT, the program number P and the registration number E are first cleared to zero, as shown at steps 3111 and 3112 in FIG. 22B. Then, decision is made successively, starting from the leading or start block of the program control table (FIG. 5), as to whether the parent program number (No.) coincides with the program number of the document edit section itself (step 3114). When coincidence is found, the latter program is regarded as the PCB 573 for the field edit section which can be activated by the document edit section, whereupon the program number P and the data species number $D_p$ set in the PCB 573 are registered in the SFMT (step 3115). Further, a data name corresponding to the data species name (e.g. "graphic pattern", "graph" etc.) is read out from the DNDT (FIG. 6) and registered as the name of the pull-down menu data for creating a new field in the menu data (FIG. 23) possessed by the document edit section (step 3116), being followed by a step 3117 where the registration number E is incremented. The processing mentioned above is repeated a number of times corresponding to the number of the program management blocks (steps 3118, 3113). Finally, the registration number E is entered in the number of field edit sections 5681 (step 3119), whereby only the names of the field edit sections actually incorporated in the system currently can be displayed in the pull-down menu.

Figure 24:
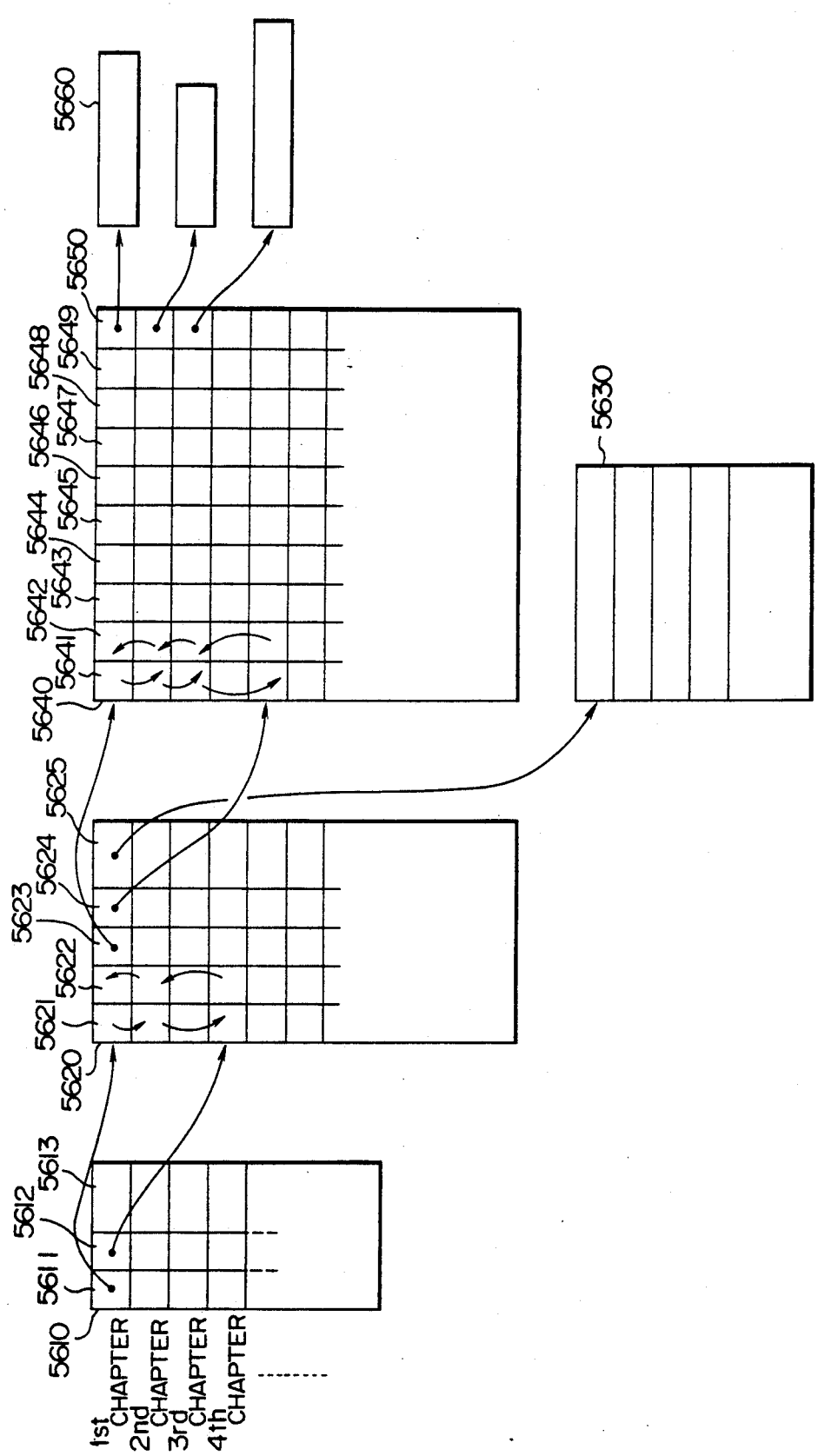
FIG. 24 is a view showing a structure of document data.

Here, structure of the document data will be described by referring to FIG. 24.

The document data includes a chapter management table 5610, a page management table 5620, a page format table 5630, a field management table 5640 and intra-field data 5660, wherein each table is composed of plural blocks. Details of these tables are as follows.

CHAPTER MANAGEMENT TABLE 5610

This table manages information about how many chapters are included in a whole document and contains page pointers 5611 and 5612 indicating the start/end pages of each chapter. Additionally, the chapter management table holds print information 5613 for displaying and/or printing header, footer or the like for each of the chapters.

PAGE MANAGEMENT TABLE 5620

Figures 25, 26:
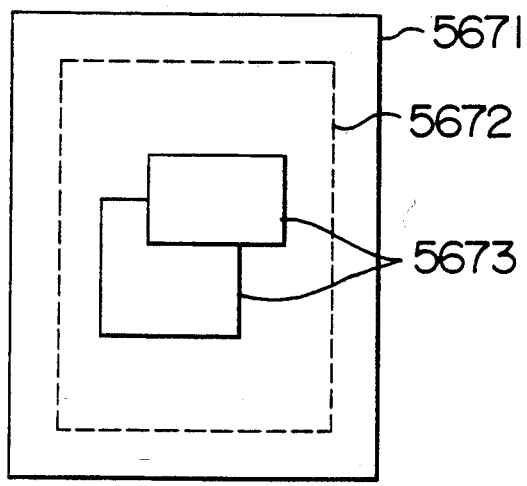
FIG. 25 is a view showing a structure of page.
FIG. 26 is a view for illustrating relationship between the number of the fields designated to be processed and types of executable field editions.

This table contains field pointers 5623 and 5624 for indicating start/end fields of those included in the page and a page format pointer 5625 for indicating which of the format data is used on a particular page. The blocks are linked in the page ascending order by backward pointer 5621 and forward pointer 5622. The start and end pages are pointed by the aforementioned chapter management table. In the case of the illustrated document data, page is of such a structure as shown in FIG. 25. In the figure, a reference numeral 5671 indicates the page. It should be noted that the page size and the blanks (margins) are managed with the aid of the page format table mentioned below, while the base field 5672 and internal fields 5673 are managed by the field management table 5640.

PAGE FORMAT MANAGEMENT TABLE 5630

This table is used for managing document format data such as types of print sheets (A3, A4, etc.), paper direction (longitudinally or transversely), top, bottom, left and right blanks or margins.

FIELD MANAGEMENT TABLE 5640

This table manages the data to be contained in the document (or on page). More specifically, the table is used for determining intra-page positions and sizes for various data such as, for example, text data, pattern data, graph data etc. To this end, the field management table contains as the intra-page field location information the upper left x- and y-coordinates 5643 and 5644, lower right x- and y-coordinates 5645 and 5646 for defining the field in the coordinate system having the origin located at the upper left corner of the page field exclusive of the blank portion. Additionally, the field management table 5640 contains data species information 5647 indicative of the species or type of the intra-field data, the field attributes of the field itself 5648 and a data pointer 5650 for pointing the intra-field data 5660. As the attribute information of the field, there can be mentioned information indicating whether the field is transparent or opaque (the opaque page field covers invisibly the underlying field) and line species information for the field frame. Additionally, in order to manage the overlapping sequence of the fields within one and the same page, the fields are linked together by the backward pointer 5641 and the forward pointer 5642. This inter-field linkage is realized in the up-direction starting from the field having the lowest priority level to the field imparted with the highest priority level, i.e. from the bottom field to the topmost field in a page. Of the interlined fields, the start/end fields are pointed by the page management table mentioned above. Additionally, the field management table 5640 contains status information 5649 indicating whether a concerned field is being edited and whether the field edit section corresponding to the field data species of concern exists or not in the currently working system.

The intra-page fields may be globally classified into two groups mentioned below.

(i) Internal fields 5673

These fields exist in the base field mentioned below. Position and size of the internal field can be determined through manipulation by the operator. Each of the internal fields can contain one of various data such as text, pattern, graph, image and others. This internal field is susceptible to all the field editions such as new field creation, update, movement, copy, deletion and others.

(ii) Base field 5672

The base field corresponds to the whole field of a page exclusive of the top, bottom, left and right margins (blanks) thereof. Whenever a page is created through manipulation by operator, one base field 5672 is created. This field always assumes the leading position on the page (i.e. bottom field). This base field contains only the text data constituting the body of document and is susceptible only to the new field creation and update. Other sorts of editing such as move, copy, deletion, etc. for the base field are performed in terms of page editing such as move, copy and deletion of the associated page.

INTRA-FIELD DATA 5660

This data is placed in the fields and can include text data, pattern data, graph data, image data, etc.

Now turning back to FIG. 21, the document edit section 561 issues an input request to the input control section 51 at a step 3002 in succession to the initialization step 3001. Next, at a step 3003, the result of input operation performed by operator is checked. If it is found that a field processing is commanded, the field as designated is identified on the basis of the page number, the designated intra-page location and the set position of the field included in the document data, whereupon the relevant field number (No.) is registered in the target field table (step 3004). A decision method involved in this processing will be described below in more detail by referring to the flow chart shown in FIG. 22C.

In the first place, a decision is made as to whether the designated location lies within the base field 5672 (step 3201). In case the designated location lies outside of the base field, it is determined that none of the fields corresponding to the designated location (position) exists, whereby a designation error message is issued. If the designated location is determined to lie within the base field, a decision is then made whether the designated location exists within any one of the internal fields 5673 by checking sequentially starting from the field of the highest rank (the intra-page end field) at steps 3202 to 3205. When the result of this decision shows that the designated location exists within an internal field, it is determined that the processing command of the operator is directed to the processing for the internal field, whereby the internal field designation flag is set to "1" (step 3206). On the other hand, when it is ultimately found that the designated location or position does not lie within any internal field on the page being currently displayed (i.e. when the internal field designation flag is "0"), it is decided that the operator designates the base field. When the designated position or location lies within an internal field 5673, it is then decided whether that field has already been registered in the target field table (step 3207). In case the field has been registered as the target, the succeeding field (i.e. the field of the document data indicated by the forward pointer 5642 of the field management block of the field now being subject to the decision) is checked. On the other hand, unless the number of the designated field has been registered in the target field table, the former is newly registered in the target field table. In this connection, it should be noted that when the relevant base field has been designated as the target field (step 3208), information 5684 about the number of the designated field contained in the target field table is once cleared to zero (i.e. target designation to the base field is once cleared) (step 3209), and thereafter the above-mentioned internal field number and the field species or type are registered in the target field table, whereupon the number of the designated fields (denoted by 5681) is incremented by "1" (step 3210). The reason why the designation of the base field which has been already registered as the designated field is forcibly cleared can be explained by the fact that none of the field editing can cope with such situation where both the base field and the internal field are simultaneously designated. Further, when the internal field has not yet been registered in the processing mentioned above, it is checked whether the internal field designation flag is "0" or not (step 3212). If the flag is "0", it is then determined that none of the internal fields exists at the designated location and that the operator designation is directed to the base field. Accordingly, the base field number is registered in the table. In that case, however, it is again checked whether the base field has been designated as the target for the processing (step 3213). If not, it is then decided if an internal field has been designated (step 3214). If so, the target field table is once cleared (step 3215) and thereafter the base field number and the field type are registered in the target field table, with the number of the designated field being set to "1" (step 3216).

Assuming that the operator command is to cancel a designated field in the course of target designation, it is determined which field is designated on the basis of the page number, the designated intra-page position and the field set position contained in the document data, which is then followed by canceling the relevant field number from the target field table (step 3005 in FIG. 21). This decision step will further be described by referring to the flow chart shown in FIG. 22D.

At first, it is decided whether the designated location lies within the base field (step 3251). If the result of the decision is negative (N), the target field table is cleared unconditionally. In other words, all the designated fields registered in the target field table are canceled (step 3258). On the other hand, when the result of the decision step (3251) is affirmative (i.e. when the designated location lies within the base field), the fields are sequentially checked starting from the field of the highest rank (i.e. the intra-page end field) as to the existence of the designated location in any one of the fields (steps 3252 and 3523). If the decision has proven that the designated location exists in a field, it is then checked whether that field has been registered in the target field table (step 3254). If so, the relevant field number is deleted from the target field table (step 3257). On the other hand, unless the designated location has been found in the checked fields at the step 3253 or alternatively unless the relevant field number has not been registered in the target field table at the step 3254, the similar decision procedure is taken for other succeeding fields through steps 3255 and 3256.

In the course of the field designation/cancel operation mentioned above, the edit processing for the permissible fields may vary from one to another field. In this conjunction, the valid/invalid state of the pull-down menu participating in the field processing is also changed correspondingly. This processing (corresponding to the step 3014 shown in FIG. 21) will be described below in detail by referring to FIG. 22E.

The edit operation for the fields may be classified into three groups in dependence on the number of the fields designated as the target for the processing, as shown in FIG. 26. More specifically, the number of the fields designated as the target for the processing is determined (step 3301). When the number of the fields is found zero (0), only the pull-down menu for creating a new field is validated with all the remaining field edit processings being invalidated (step 3302). To the contrary, when the number of the fields designated as the target or object for the processing is "1 (one)", then the edition processing for all the other fields is validated (step 3303). Further, when the number of the fields designated as the target exceeds "2", only the field processing "move", "copy" and "delete" are validated with all the other edition processing being invalidated (step 3304). In case the number of the fields designated as the target is "1", it is additionally decided whether the designated field is the base one (step 3305). If so (Y), alteration of the attributes and size are inhibited (step 3306). Subsequently, it is checked whether the status of the designated field is other than "0" (step 3307). If so, this means that the field of concern is currently undergoing the edit processing or alternatively field edit section capable of renewing the field of concern does not exist in the system operating currently, and thus the renewal is also invalidated (step 3308). When the number of the fields designated as the target exceeds "1", it is then checked whether there exists the field whose status is "1" (i.e. the field currently undergoing the processing) among those designated (step 3309). If so, the deletion is also invalidated (step 3310).

Figure 22F:
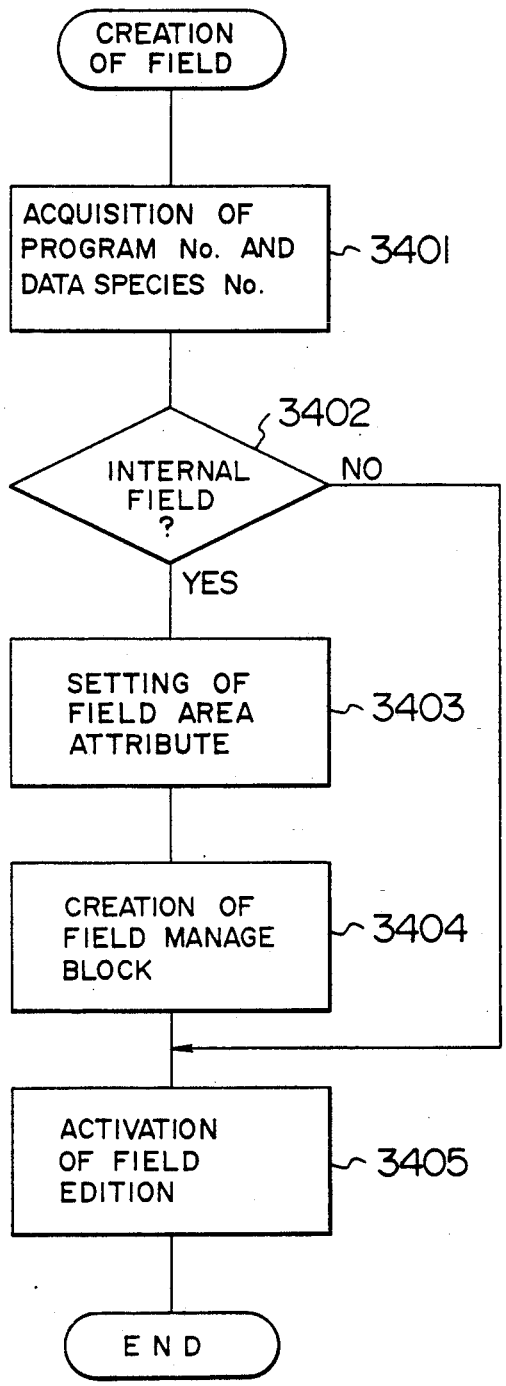
FIG. 22F is a view illustrating in a flow chart a new field creation processing executed by the document edit section.

Next, description will be made by referring to the flow chart shown in FIG. 22F on the assumption that operator command is to create a new field (step 3006 in FIG. 21).

In this case, the operator command for creating a new field is validated by designating a data name displayed within the pull-down menu. More specifically, the document edit section 561 acquires the relevant program number and data species number by consulting the aforementioned SFMT (FIG. 27) with the aid of the pull-down menu number supplied from the input control section 51 (step 3401) to determine the data for which the field creation has been commanded (step 3402). When the data of concern is for the inner field, the area as well as attributes of that field are set (step 3403). Subsequently, in accordance with the information mentioned above, a field management block is created (step 3404) to thereby activate the field edit section (step 3405). This activation processing will be described hereinafter.

Figure 22G:
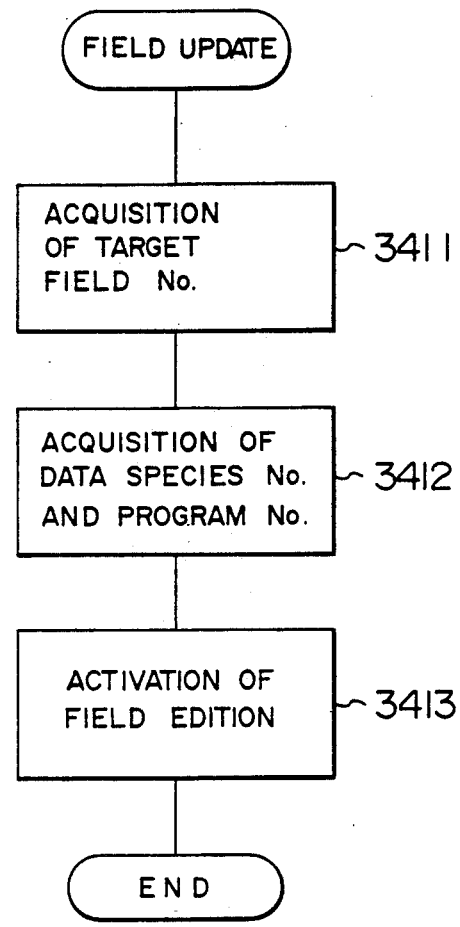
FIG. 22G is a view illustrating in a flow chart a field update processing by the document edit section.

Assuming that the operator command is to update the field created previously (the step 3007 in FIG. 21), the corresponding field number is retrieved from the target field table 5686 shown in FIG. 22G (step 3411). With the aid of this field number, the relevant program number is acquired from the SFMT by consulting the relevant field management block containing the data species (step 3412), whereupon the associated field edit section 562 is activated as a task (step 3413).

Figure 22H:
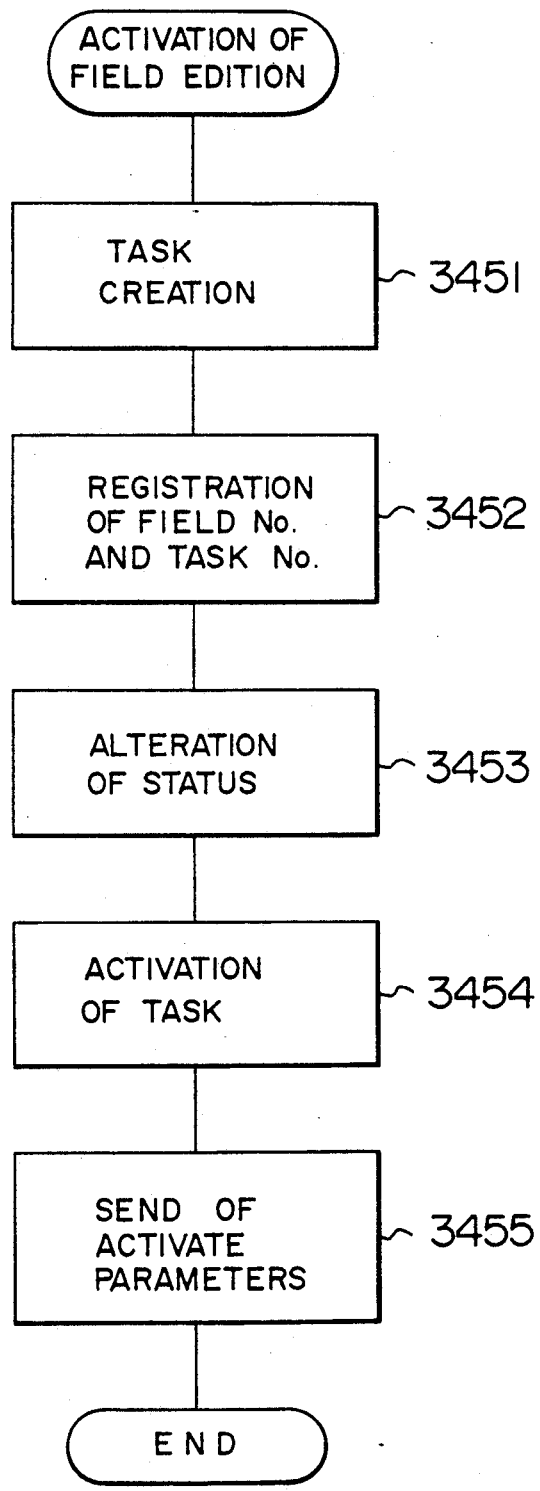
FIG. 22H is a view illustrating in a flow chart a field edition activate processing in the new field creation processing and the field renewal processing executed by the document edit section.
Figure 22I:
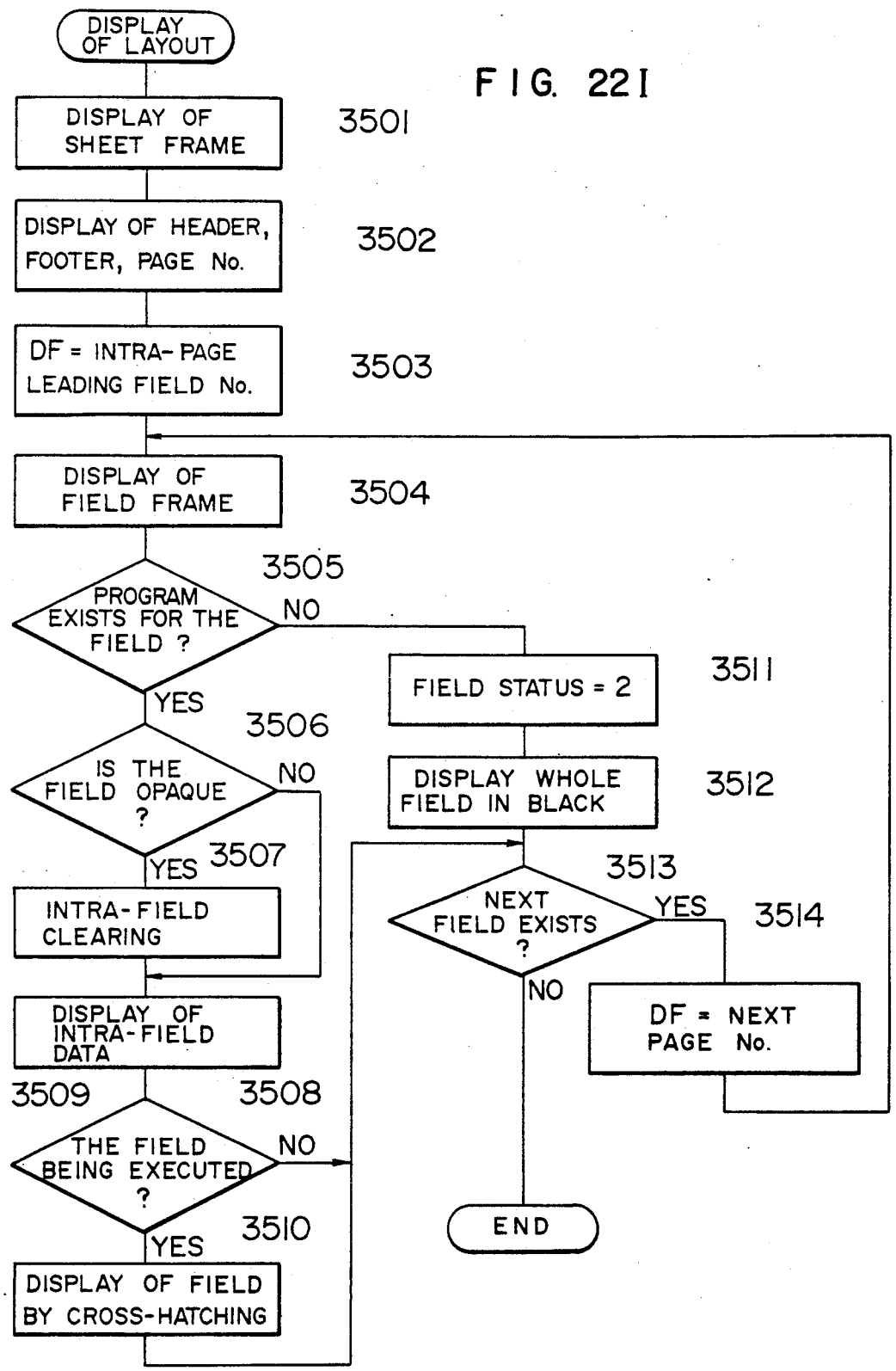
FIG. 22I is a view illustrating in a flow chart a layout display processing executed by the document edit section.

When the field edit section 562 is activated, the document edit section 561 issues a task creating request to the system control section 53 (step 3451), as shown in FIG. 22H. In response, corresponding task number and field number are fed back to the document edit section 561 and registered in an activated edition task management table (hereinafter referred to as ETMT in abbreviation) (step 3452). The table ETMT holds the above-mentioned task numbers (No.) 5688 and the field numbers (No.) 5689 each in a pair and additionally contains an activated task number information 5687 indicating how many field edit sections are currently being activated, as shown in FIG. 29. Subsequently, the status of the field management block indicating that the field of concern is undergoing edition processing is changed from "0" to "1" (step 3453). In succession to the processing mentioned above, the document edit section 561 issues a task activation request to the system control section 53 (step 3454) and sends a corresponding message to the field edit section for activating the activation parameters (step 3455). In response, the document edit section transmits as the activation parameters the activation mode indicating either the new field creation or field update, the task number of the document edit section 561 and the task number of the field edit section to be activated, together with the field size information in the case of the new field creation.

When other field editing such as, for example, movement, deletion, page insertion, addition or other is designated, the corresponding processing is performed (steps 3003 to 3011 in FIG. 21), and a next operator command is awaited (step 3002).

Next, it is assumed that the operator command is to change or switch the displayed page (e.g. command for displaying the preceding or succeeding page) (step 3012 in FIG. 21). In this case, the layout of the designated page is displayed again within the window. The processing for layout display will be described below in detail by referring to FIG. 22I.

In the layout display, the page frame, header, footer and the like are first displayed by retrieving the document data (steps 3501 and 3502). Subsequently, the fields created within the page are sequentially displayed, starting from the field of the lower priority (i.e. the intra-page leading field) (steps 3503 and 3514). In the field display, a field frame is first displayed (step 3504). Subsequently, it is decided whether there exists the edit program for the data for that field by checking the data species numbers contained in the associated field management block and consulting the SFMT (step 3505). If the edit program is absent, the status of the associated field management block is altered to "2" (step 3511), while the area of the field enclosed by the frame is displayed in black for informing operator of the unavailability of the edit program for the above field in the system (step 3512). On the other hand, when the edit program is present, decision is then made as to whether the attributes belonging to the field of concern are transparent (step 3506). If opaque, the inner area of the field is once cleared (step 3507), being then followed by the display of the intra-field data (step 3508). Further, in succession to the display, decision is made on the basis of the status information relevant to the field as to whether the field is being edited (i.e. if the status information is "1") at a step 3509. If the result of this decision step is affirmative (Y), the field is displayed with cross-hatching to inform the operator of the field undergoing currently the edit processing (step 3510). Similar processing is performed on all the remaining fields existing on the page being displayed (steps 3513 and 3514).

The processing of the activation inputs for the window switching (change-over) operation (step 3013 in FIG. 21) will be described hereinafter. When termination is commanded, the edition of the document comes to an end (step 3015 in FIG. 21). This processing will also be elucidated hereinafter.

Now, consider the case where the field edit section 562, e.g. the pattern data editing section is to be activated by the document edit section 562 in response to the command for creation or update of a field. In this case, the system control section 53 responds to this request by activating newly the pattern edit section as a task.

The processing performed by the pattern data edit section is described below by referring to the processing flow chart shown in FIG. 30.

At first, the pattern data edit section receives the activating parameters in the form of a message (step 4001), and decision is made as to whether the activation mode is for a new field creation or field update (step 4002). If the decision results in the new field creation, initialization of data is first executed (step 4003). When the result of the decision shows the field update, the data to undergo the update processing are read out from the storage unit (step 4004). Subsequently, a window is opened (step 4005), and the pattern data is displayed within the opened window (step 4006). In this case, the size of the window is so opened as to correspond to that of the field. Additionally, the title attached to the window is added with the task number of the document edit section which activated the update mode. By virtue of this feature, it can be easily discriminated on the basis of the task number 254 displayed as a part of the window title which of the document the field of concern belongs. This is very convenient when a plurality of documents are simultaneously edited with some of the fields of these documents being displayed, as shown in FIG. 32. In this case, the state of display is such as shown in FIG. 31B. Subsequently, the pattern data edit section performs creation and editing of pattern data within the opened window in accordance with instructions inputted by operator (step 4007-4009). When the end of the intra-field editing is commanded by operator, the pattern data edit section stores the prepared pattern data in the storage unit 3 (step 4010), closes the window (step 4011), sends the field editing end message to the document editing section 561 which activated the field editing (step 4012) and terminates the task (step 4013). The field editing and termination message is affixed with an end code indicative of the completed intra-field editing and the task number of the pattern editing section itself so that the document editing section which has activated the field editing can know any particular field for which the edit processing has been completed.

Figure 17:
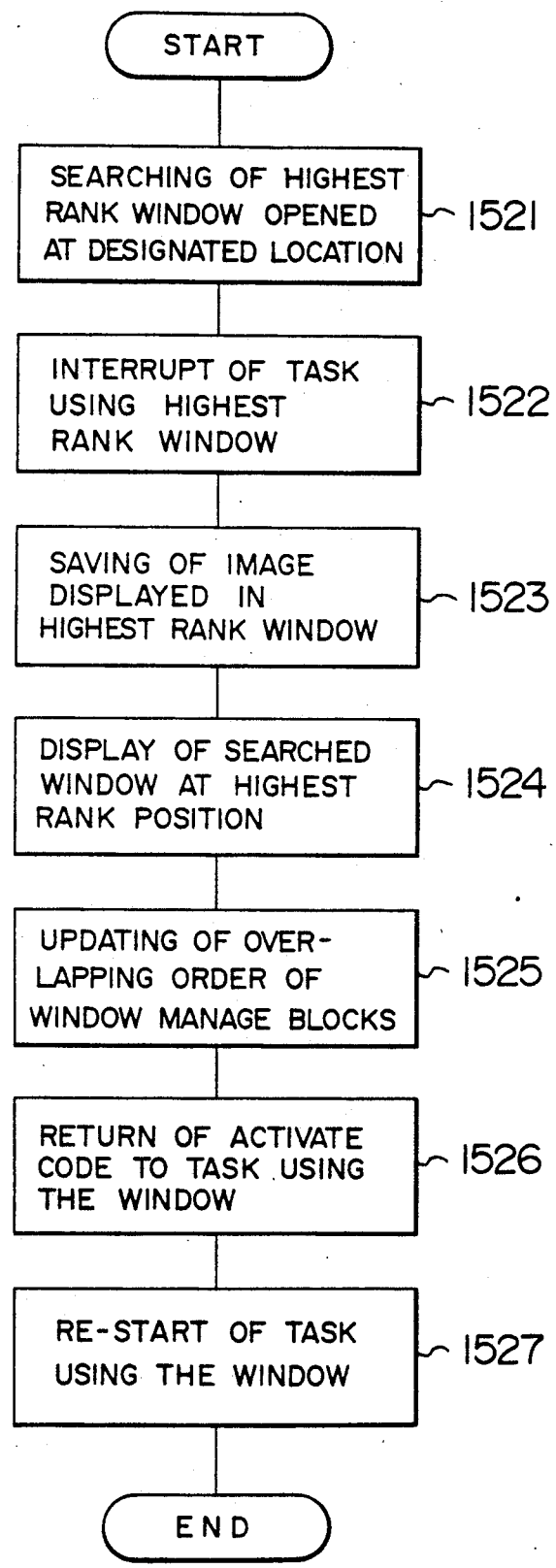
FIG. 17 is a view illustrating in a flow chart a window switching (change-over) processing.

In this manner, the whole document as well as the intra-field contents can be created and edited. Next, description will be directed to the operation and processing for changing over (switching) the editing sections through window manipulation by referring to FIGS. 31A, 31B and 31C in combination with FIG. 17.

Figure 31C:
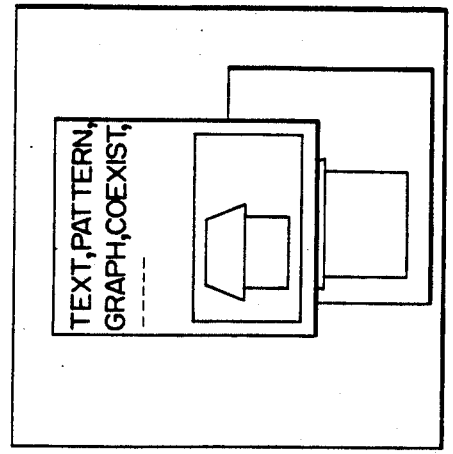
FIGS. 31A to 31E are views for illustrating changes in screen display generated through the document edit procedure to which the invention is applied.
Figure 31B:
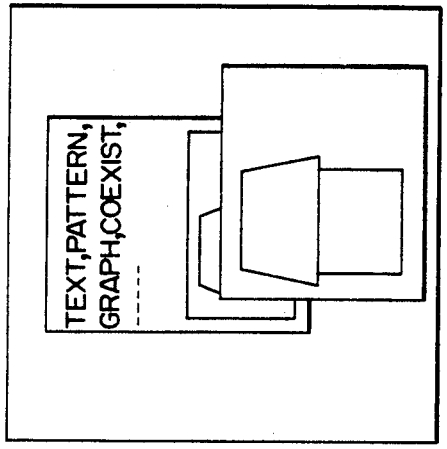
Figure 32:
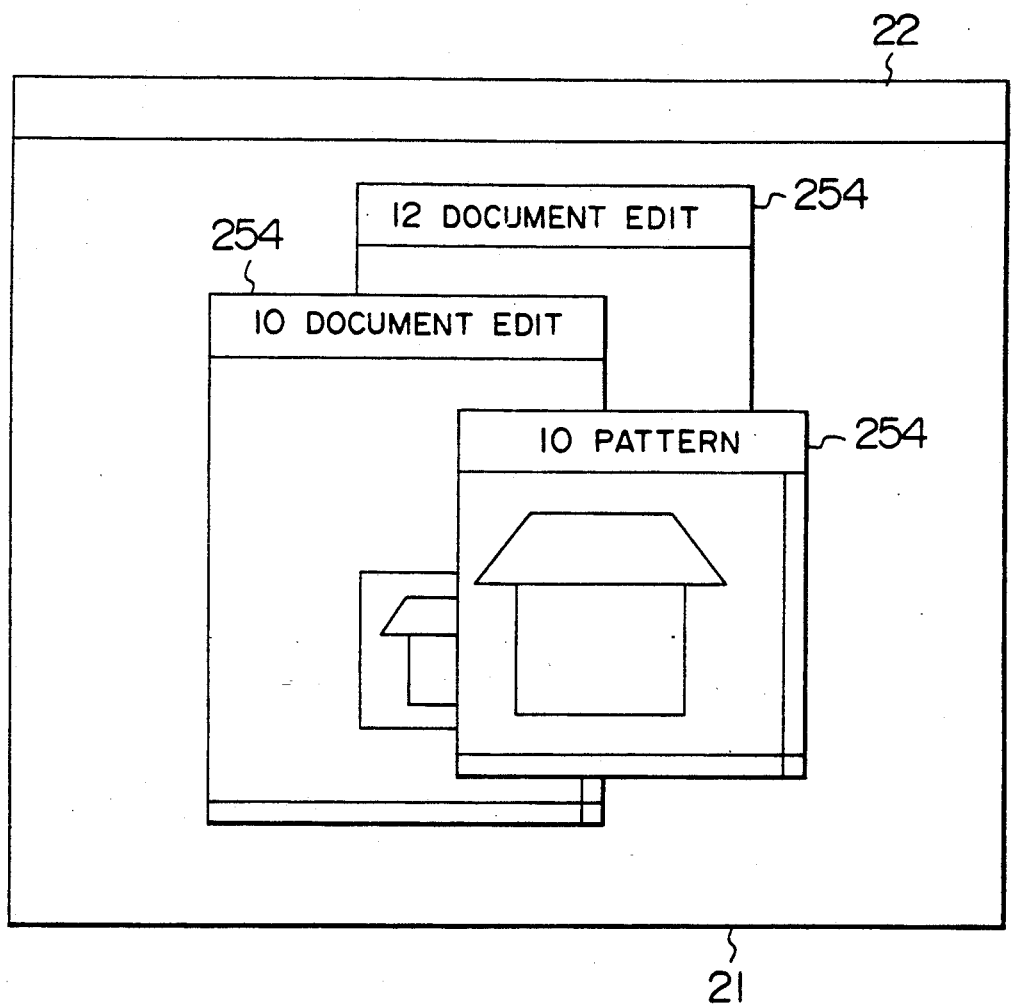
FIG. 32 is a view showing a window display image generated by the pattern data edit section.

First referring to FIGS. 31B and 31C, when editing of the document layout is to be done in the course of editing of the intra-field pattern data, the mouse cursor 30 is moved onto the window of the document edit section 561 as in the case of the designation of target to be processed described hereinbefore and the execute button of the mouse is pressed. In response to this input command, the input control section 51 determines that the designated position is located outside of the window in which the pattern field editing was being executed. Accordingly, the input control section 51 transfers the input command to the window management section 52 instead of the pattern editing section. The window management section 52 determines on the basis of the mouse-designated position and the window management table that the window for the document editing section 561 is designated (step 1521) and interrupts once the task which has used the uppermost window until then, i.e. the pattern edit section (step 1522), while the displayed image data within the uppermost window is saved in the display buffer (step 1523). Subsequently, the window for the newly designated document edit section is displayed uppermost (step 1524), the overlapping sequence of the window management blocks is correspondingly updated (step 1525), and an activate code is returned to the task using the window of concern for informing the document edit section ready for restarting new processing of the fact that the window has been switched (step 1526), whereupon the task using the window of concern, i.e. the document edit section, is restarted (step 1527).

The interruption and restart of the editing described above are performed under the control of the system control section 53. Next, the interrupt and restart processing will be described by referring to FIGS. 12F and 12G.

When a task interrupt request is issued, the system control section 53 sets the interrupt flag of the TCB corresponding to the task designated (step 1141), decides whether the task of concern is in the READY state (step 1142), and releases the corresponding TCB from the READY queue when the task is in the READY state to thereby prevent the CPU from allocation by the dispatcher (step 1143).

In response to the task restart request, the interrupt flag of the TCB corresponding to the designated task is reset (step 1151), and decision is made if the task of concern is in the READY state (step 1152). If so, the task is again linked to the READY queue (step 1153). In case the interrupt flag of TCB is set, the task dispatcher is inhibited from activating the task of concern, which released from the READY queue.

Figure 31E:
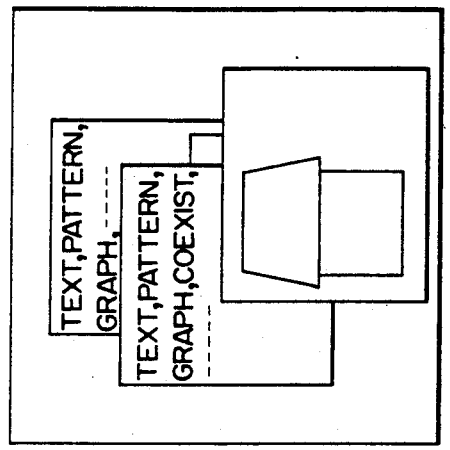
Figure 31A:
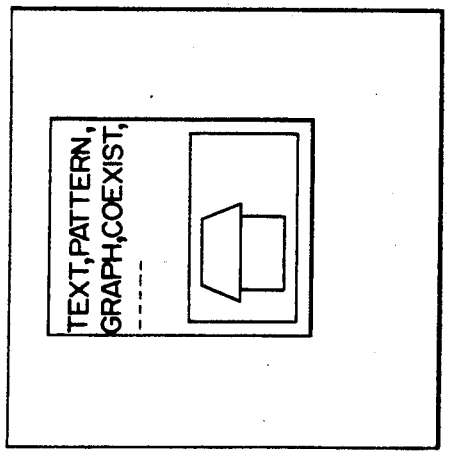
Figure 31D:
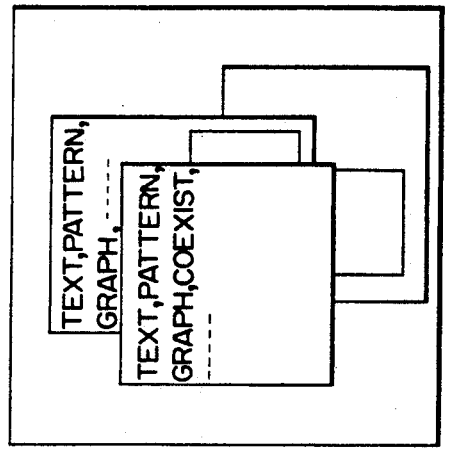

When the update processing of the base field is performed starting from the state illustrated in FIG. 31C, the display on the screen is changed to the state shown in FIG. 31D. In this state, the switching or change-over of the individual editing sections for the text, pattern and the layout from one another can be realized in desired manners through the operation procedure described above. By way of example, switching of the field editing section, i.e. changing-over from text to pattern results in the screen display state shown in FIG. 31E.

As mentioned above, upon window switching, the activate code is returned as input to the task restarted by the window management section.

Figure 22J:
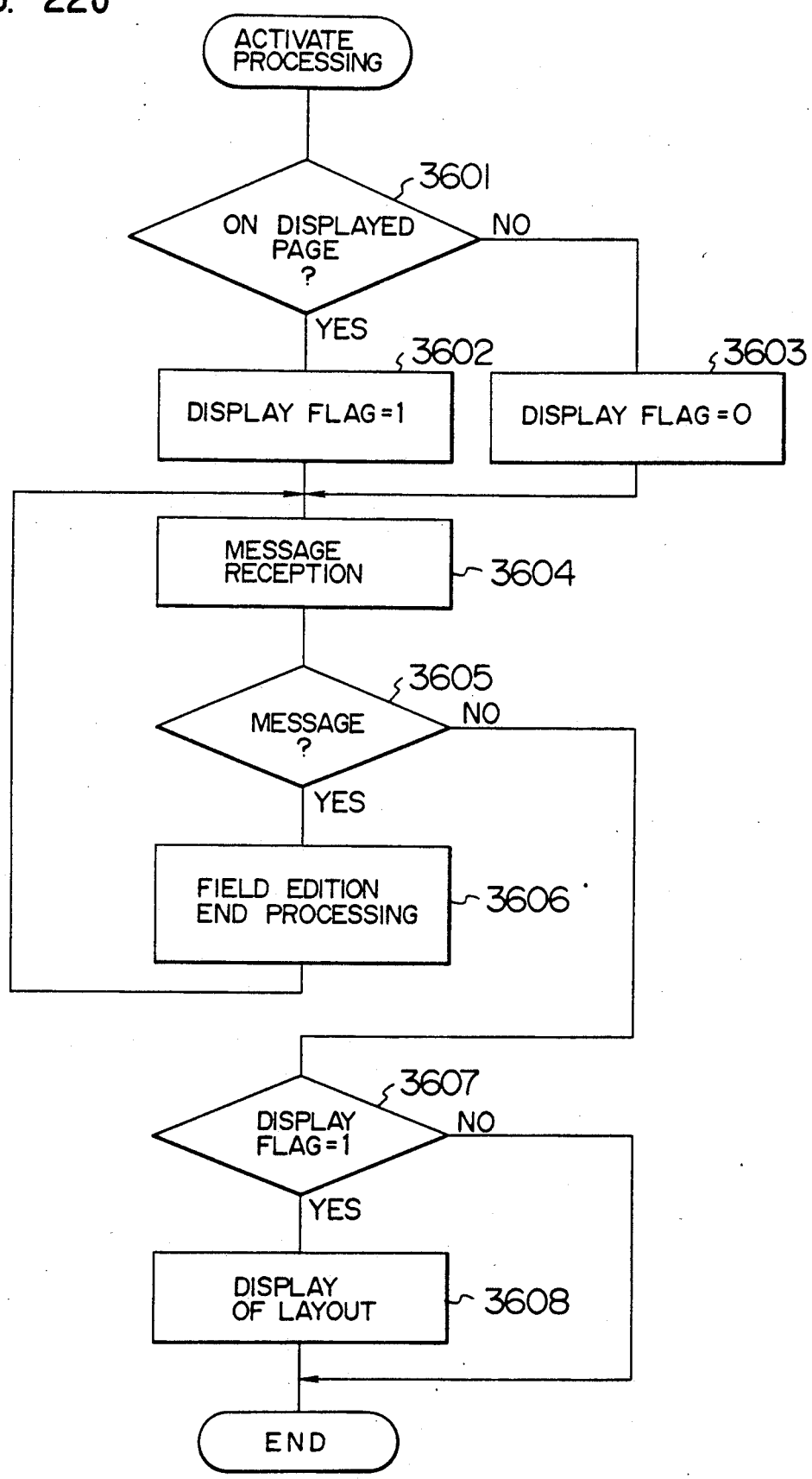
FIG. 22J is a view illustrating in a flow chart an activate processing executed by the document edit section.
Figure 22K:
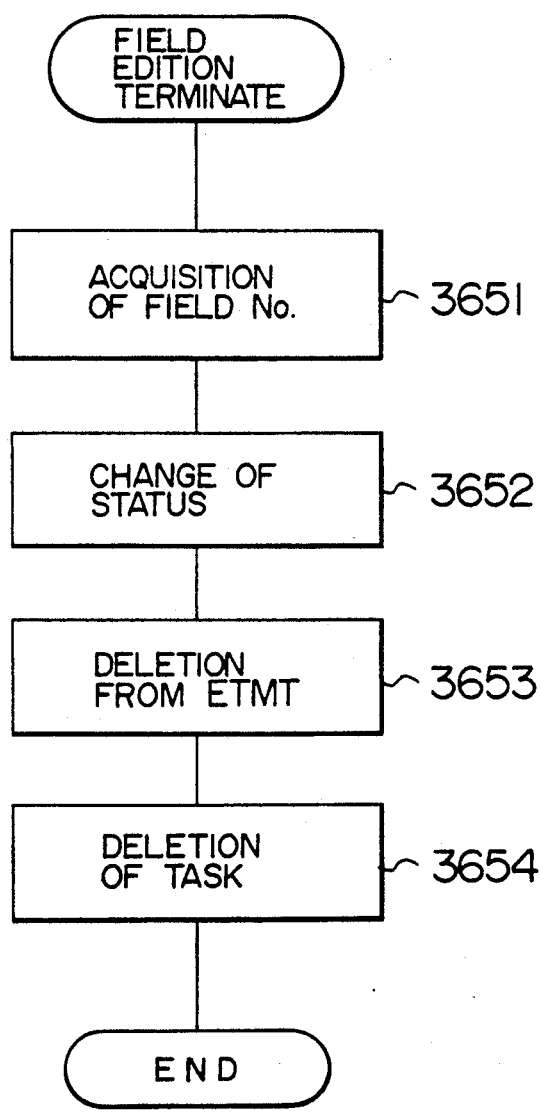
FIG. 22K is a view illustrating in a flow chart a field edition end processing in the activate processing executed by the document edit section.

In the case of the example described above, when the pattern edit section is switched to the document editing section 561, the latter receives the activate code as the input thereto after having been restarted and executed the processing mentioned below (see FIGS. 22J and 22K).

In the first place, the decision is made on the basis of the document data if there exists a field undergoing editing on the page being displayed currently (step 3601). If present, the display flag is set to "1" (step 3602), since the content of that field may possibly be renewed by editing. On the other hand, when such field is absent, the display flag is set to "0" (step 3603), whereupon the processing for displaying again the layout is executed in succession to the processing of message. Subsequently, a message reception request is issued to the system control section 53. If the message is present, end procession for the relevant field editing section is performed, as mentioned below (step 3604 to 3606). At first, the field number is acquired from the task number of the field editing section contained in the message and the ETMT (FIG. 29) (step 3651). Subsequently, the status of the relevant field management block is reset to "0" (step 3652). Information about the task of concern is deleted from the ETMT (FIG. 29) (step 3653). Finally, that task itself is also deleted (step 3654). On the other hand, unless message is received, it is then decided whether the display flag is set to "1" (step 3607). If so, the layout of the relevant page is displayed again (step 3608).

Figure 22L:
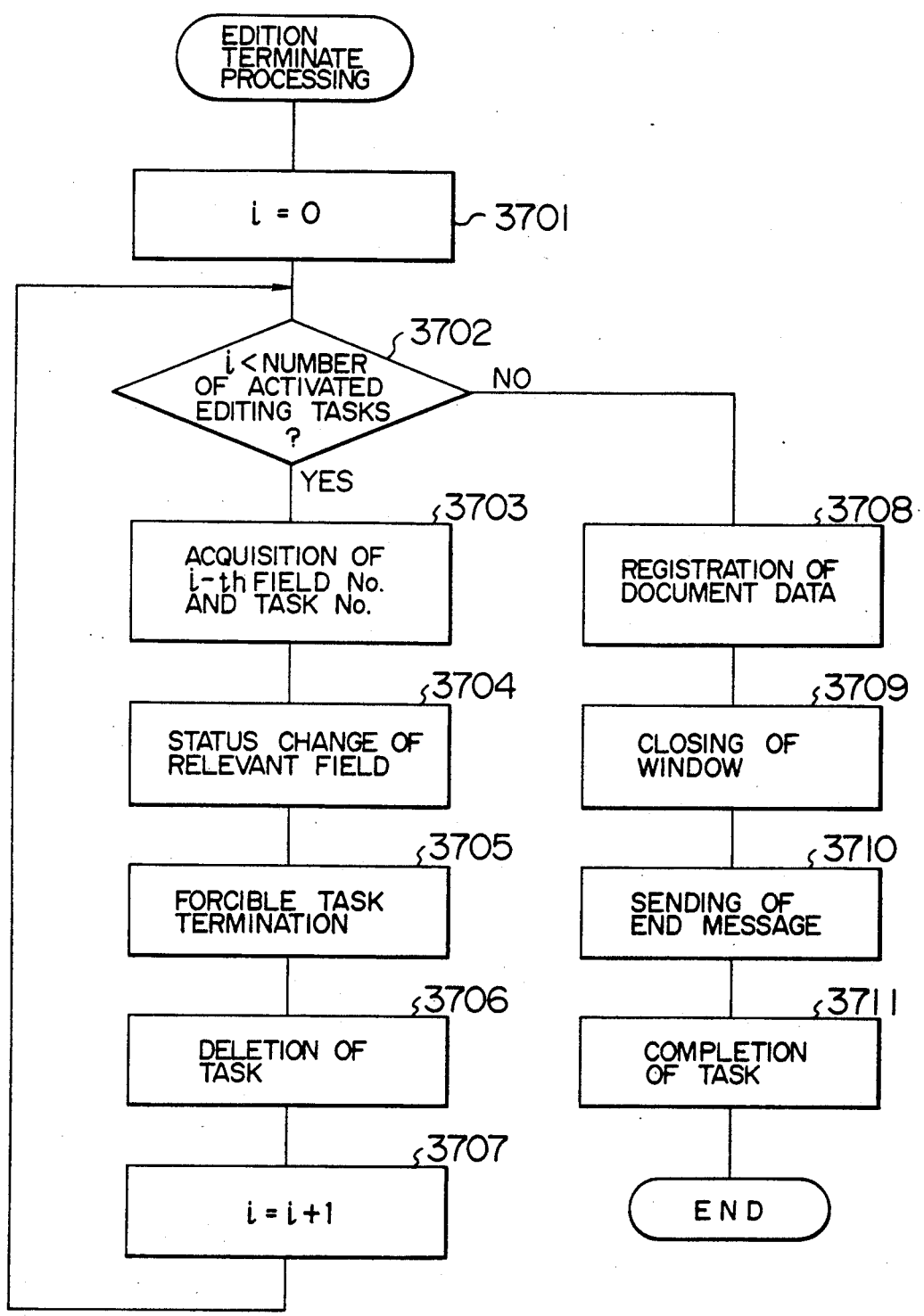
FIG. 22L is a view illustrating in a flow chart an edit end processing executed by the document edit section.

Finally, the end processing performed by the document editing section 561 will be described by referring to FIG. 22L and FIG. 12H.

Upon inputting of the end or termination command by operator, decision is made on the basis of the aforementioned ETMT whether there exists the editing task being currently activated (step 3702). If present, the corresponding task number and the field number are retrieved from the ETMT (FIG. 29) (step 3703). The status of the relevant field is reset to "0" (step 3704). Subsequently, the forcible task end request is issued to the system control section 53 (step 3705). Accordingly, the system control section 53 releases the resource used by the designated task (step 1161) and issues the forcible end processing request to the window management section (step 1162), as shown in FIG. 12H. The window management section 52 performs the processing similar to the window closing processing, as shown in FIG. 16. On the basis of the designated task number (No.), the corresponding TCB, if any, is released from the header 533 of the READY queue, and the TCB is set to the DORMANT state (step 1163). After the forcible processing mentioned above completed, the document editing section 561 deletes the task (step 3706).

The above-mentioned processing is executed repeatedly on the editing tasks being activated (step 3707). Upon completion of the forcible end processing for all the task being activated, the document data is registered (step 3708). The window opened by the document editing section is closed (step 3709), and a message to the effect that the processing has come to an end is transmitted to the system management section 57 (step 3710). The task is then terminated.

As will be understood, all the field editing sections 562 performing the respective editing operations can be simultaneously stopped, in response to the end request issued to the document editing section 561.

As will be appreciated from the foregoing description, the document creating apparatus or so-called word processor according to the present invention is capable of mutually changing over editing operations such as intra-field data creation and editing as well as displayed pages and field editions on the layout image without terminating the functions of the individual editing sections, whereby operability for creation of the documents in which plural different types of data coexist mixedly can be significantly enhanced.

We claim:

1. A window management apparatus for a document creating apparatus, comprising:
   input means for inputting on a field-by-field basis descriptive element data to be entered in a document in which a plurality of various species of said descriptive element data, such as text data, graph data, pattern data, image data and other data coexist;

storage means for storing said descriptive element data inputted through said input means;

display means for displaying dot patterns on the basis of said various species of said descriptive element data stored in said storage means;

document edit means for causing said display means to display a page layout of a document to be created in a window opened in said display means, for assigning a field within said page layout, and for performing editing functions such as displacement and copying on fields on said page layout displayed in accordance with input information supplied from said input means;

field edit means for displaying said descriptive element data for each one of said fields within said window and for performing editing functions such as inputting, displacing and copying on said descriptive element data in accordance with said input information supplied from said input means, said field edit means including a plurality of edit divisions corresponding to said species of said descriptive element data;

window management means for opening a window of a certain size in a certain position of said display means according to a request from said document edit means and said field edit means, and for displaying edited data from said document edit means and said field edit means in said window opened in accordance with said request from said document edit means and said field edit means;

activate means for activating one of a plurality of edit divisions in accordance with said species of said descriptive element data in a field which is assigned for creation and updating by said document edit means; and edit switching means for changing-over said document edit means and said field edit means activated by said activated means without terminating said editing functions of said document edit means and said field edit means.

2. A window management apparatus according to claim 1, wherein said edit switching means changes over edit divisions activated by said activate means without terminating the functions of said edit divisions activated by said activate means.

3. A window management apparatus according to claim 1, wherein said edit switching means selects for the changing-over of said editing of one of said activated said edit divisions without terminating said editing functions thereof.

4. A window management apparatus according to claim 1, further comprising:

field edit means for creating and editing said descriptive element data in each of said fields in dependence on said species of said descriptive element data in said field and in accordance with said input information from said input means;

document edit means for causing said display means to display said page layout of said document to be created and for performing editing of said fields on said displayed layout in accordance with said input information supplied from said input means and additionally activating said field edit means corresponding to said descriptive element data of said fields created or updated;

window display means for displaying the contents of said descriptive element data handled by an individual edit means separately in respective areas;

information communicating means for performing transfer of information among said individual edit means; and edit switching means for selectively changing-over the editing performed by said individual edit means;

wherein said document edit means and said field edit means include identificating name displaying means for displaying identification names corresponding to said document edit means and said field edit means activated by said document edit means separately within display areas generated by said window display means.

5. A window managment apparatus according to claim 1 further comprising:

field edit means for creating and editing said descriptive element data in each of said fields in dependence on said species of said descriptive element data in accordance with said input information from said input means;

document edit means for causing said display means to display said page layout of said document to be created, performing editing of said fields on said displayed layout in accordance with said input information supplied from said input means and activating said field means corresponding to said descriptive element data of said fields commanded to be created or updated;

edit switching means for selectively changing-over the editing performed by said edit means;

wherein said document edit means comprises:

managing means for managing said activated field edit means; and field edit terminating means for terminating forcibly the field editing by executing the termination processing to thereby terminate the editing function of said field edit means being activated when document editing terminating information is inputted through said input means.

6. A window management apparatus according to claim 1, further comprising;

field edit means for creating and editing the data in each field in accordance with said input information supplied from said input means;

document edit means for causing said display means to display a page layout of a document to be created performing editing of said fields on said displayed layout in accordance with said input information supplied from said input means and activating said field editing means corresponding to said descriptive element data of said fields created and updated;

edit switching means for selectively changing-over the editing performed by said edit means;

wherein said edit switching means comprises informing means arranged such that when execution of editing by a given one f said edit means is changed over to execution of editing by other edit means in the process of editing performed by said given edit means and execution of editing is again changed over to said given edit means, the second mentioned change-over is communicated to said edit means which restarts execution of editing; and said document edit means comprises:

manage means for managing said field in the document which is in the process of being edited; and layout re-displaying means for deciding whether said field which was in the process of being edited exits in an original layout upon reception of the re-start message by said edit means which restarts editing and displaying of the layout when the relevant field exists.

7. A window management apparatus according to claim 1, further comprising:

field edit means for creating and editing said descriptive element data in each of said fields in accordance with said input information from said input means;

document edit means for causing said display means to display a page layout of a document to be created, performing editing of the fields on said displayed layout in accordance with said input information supplied from said input means and activating said editing means corresponding to said descriptive element data of said fields created or updated;

inserted filed edition managing means for managing said field edit means; and field display means for determining the presence or absence of field editing to be performed on a field on a displayed page layout in a created page in accordance with management contents of said inserted field edition managing means and displaying the area where the corresponding field editing is absent in a manner differing form that for the other field.

* * * * *